US011787150B2

(12) United States Patent
Furuhashi et al.

(10) Patent No.: US 11,787,150 B2
(45) Date of Patent: Oct. 17, 2023

(54) PREPREG SHEET AND MANUFACTURING METHOD THEREFOR, FIBER-REINFORCED COMPOSITE MATERIAL MOLDED ARTICLE AND MANUFACTURING METHOD THEREFOR, AND METHOD FOR MANUFACTURING PREFORM

(71) Applicant: Mitsubishi Chemical Corporation, Tokyo (JP)

(72) Inventors: Yuma Furuhashi, Tokyo (JP); Masahiro Ichino, Tokyo (JP); Kazuhisa Ikeda, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 118 days.

(21) Appl. No.: 17/126,107

(22) Filed: Dec. 18, 2020

(65) Prior Publication Data
US 2021/0115209 A1 Apr. 22, 2021

Related U.S. Application Data

(63) Continuation of application No. PCT/JP2019/024574, filed on Jun. 20, 2019.

(30) Foreign Application Priority Data

Jun. 20, 2018 (JP) .................................. 2018-117285
Sep. 28, 2018 (JP) .................................. 2018-185494

(51) Int. Cl.
B32B 5/12 (2006.01)
B32B 5/26 (2006.01)
(Continued)

(52) U.S. Cl.
CPC ................ B32B 5/12 (2013.01); B29B 11/16 (2013.01); B29C 70/003 (2021.05);
(Continued)

(58) Field of Classification Search
CPC ......... C08J 5/24; C08J 2363/00; B29B 11/16; B29C 70/202; B29C 70/30; B29C 70/342;
(Continued)

(56) References Cited

U.S. PATENT DOCUMENTS 5,198,281 A 3/1993 Muzzy et al.
2004/0098852 A1 5/2004 Nelson
(Continued)

FOREIGN PATENT DOCUMENTS

CN 102490361 A 6/2012
CN 106232314 A 12/2016
(Continued)

OTHER PUBLICATIONS

Machine Translation of JP H05-131582 A. (Year: 1993).*
(Continued)

Primary Examiner — Brian Handville
(74) Attorney, Agent, or Firm — Oblon, McClelland, Maier & Neustadt, L.L.P.

(57) ABSTRACT

A prepreg sheet includes a plurality of prepreg tapes each of which overlaps with a corresponding adjacent prepreg tape for a suitable overlapping length. The plurality of prepreg tapes each contain a reinforcing fiber bundle that is impregnated with a thermosetting resin composition. According to a method for manufacturing a preform, for example, a primary premolded article is manufactured by preforming an intermediate base material containing a reinforcing fiber base material and a matrix resin composition, and a secondary premolded article is manufactured by preforming the primary premolded article on which the intermediate base material is further placed.

14 Claims, 7 Drawing Sheets

(51) Int. Cl.
  *B32B 27/12* (2006.01)
  *B32B 3/14* (2006.01)
  *B29B 11/16* (2006.01)
  *B29C 70/20* (2006.01)
  *B29C 70/30* (2006.01)
  *B29C 70/00* (2006.01)
  *C08J 5/24* (2006.01)

(52) U.S. Cl.
  CPC ............ *B29C 70/202* (2013.01); *B29C 70/30* (2013.01); *B32B 3/14* (2013.01); *B32B 5/26* (2013.01); *B32B 27/12* (2013.01); *C08J 5/243* (2021.05); *B32B 2260/023* (2013.01); *B32B 2605/003* (2013.01); *B32B 2605/08* (2013.01); *C08J 2363/00* (2013.01)

(58) Field of Classification Search
  CPC .......... B29C 70/345; B32B 3/14; B32B 5/12; B32B 5/26; B32B 27/12; B32B 2260/023; B32B 2605/003; B32B 2605/08; B32B 2250/05; B32B 2262/0276; B32B 2262/101; B32B 2262/14; B32B 2307/708; B32B 3/18; B32B 27/281; B32B 27/32; B32B 2260/046; B32B 5/022; B32B 7/06; B32B 15/14; B32B 15/20; B32B 27/36; B32B 29/02; B32B 2262/0261; B32B 2262/0269; B32B 2262/10; B32B 2307/734; B32B 5/02; B32B 27/34; B32B 2262/105; B32B 2262/106; B32B 2307/732; B32B 5/024; B32B 2307/748
  See application file for complete search history.

(56) References Cited

U.S. PATENT DOCUMENTS

| | | |
|---|---|---|
| 2005/0253294 A1 | 11/2005 | Takano et al. |
| 2006/0162143 A1 | 7/2006 | Nelson et al. |
| 2010/0284810 A1 | 11/2010 | Corman et al. |
| 2015/0209982 A1 | 7/2015 | Kutsuwada et al. |
| 2016/0354983 A1 | 12/2016 | Kakimoto et al. |
| 2016/0368255 A1 | 12/2016 | Witte et al. |

FOREIGN PATENT DOCUMENTS

| | | |
|---|---|---|
| EP | 2 894 019 A1 | 7/2015 |
| EP | 3 587 477 A1 | 1/2020 |
| JP | 3-112649 A | 5/1991 |
| JP | 5-131582 A | 5/1993 |
| JP | 6-114995 A | 4/1994 |
| JP | 6-322159 A | 11/1994 |
| JP | 7-186140 A | 7/1995 |
| JP | 2006-22471 A | 1/2006 |
| JP | 2010-260780 A | 11/2010 |
| TL | WO 2004/018186 A1 | 3/2004 |
| WO | WO 2012/020109 A2 | 2/2012 |
| WO | WO 2014/038710 A1 | 3/2014 |
| WO | WO 2015/125854 A1 | 8/2015 |
| WO | WO 2020/069978 A2 | 4/2020 |

OTHER PUBLICATIONS

International Search Report dated Sep. 24, 2019 in PCT/JP2019/024574, 4 pages.
International Preliminary Report on Patentability and Written Opinion dated Dec. 30, 2020 in PCT/JP2019/024574 (submitting English translation only), 11 pages.
Extended European Search Report dated Jul. 15, 2021 in European Patent Application No. 19822712.6, 8 pages.
European Office Action dated May 20, 2022, in European Patent Application No. 19 822 712.6-1014 (6 pages).
Chinese Office Action dated Jun. 28, 2022, in Chinese Patent Application No. 201980041028.0 (with English Translation).
Chinese Office Action dated Feb. 13, 2023, in Chinese Patent Application No. 201980041028.0 (with English Translation, 24 pages).
Japanese Office Action dated Apr. 4, 2023, in Japanese Patent Application No. 2020-525801.

\* cited by examiner

PREPREG SHEET AND MANUFACTURING METHOD THEREFOR, FIBER-REINFORCED COMPOSITE MATERIAL MOLDED ARTICLE AND MANUFACTURING METHOD THEREFOR, AND METHOD FOR MANUFACTURING PREFORM

TECHNICAL FIELD

The present invention relates to a prepreg sheet, a method for manufacturing the prepreg sheet, a fiber-reinforced composite material molded article, and a method for manufacturing the fiber-reinforced composite material molded article. The present invention also relates to a method for manufacturing a preform, which is a molding material for obtaining a fiber-reinforced composite material molded article, and to a method for manufacturing the fiber-reinforced composite material molded article. The present application claims priority on (i) Japanese Patent Application, Tokugan, No. 2018-117285 filed on Jun. 20, 2018 and (ii) Japanese Patent Application, Tokugan, No. 2018-185494 filed on Sep. 28, 2018, the contents of the specification of which are hereby incorporated by reference.

BACKGROUND ART

A sheet-like prepreg is frequently used to manufacture a fiber-reinforced composite material molded article. The sheet-like prepreg is, for example, an intermediate base material obtained by impregnating a sheet-like product in which reinforcing fibers are unidirectionally aligned, a woven fabric, or a nonwoven fabric, with a matrix resin composition such as a thermosetting resin composition. The fiber-reinforced composite material molded article is commonly produced by preforming the sheet-like prepreg as appropriate and subjecting the sheet-like prepreg to heating and pressurization in a mold so as to cure or solidify the matrix resin composition.

Note that examples of a prepreg that is used to manufacture the fiber-reinforced composite material molded article include not only the sheet-like prepreg but also the following: (i) an intermediate base material called a tow preg, a tow prepreg, a yarn prepreg, or a strand prepreg (hereinafter may be referred to as a "tow preg") in which a reinforcing fiber bundle including thousands to tens of thousands of filaments that are unidirectionally arranged is impregnated with a thermosetting matrix resin; and (ii) a tape-like prepreg (e.g. a slit tape) obtained by cutting, into a strip shape, a unidirectional prepreg, in which a sheet-like product in which reinforcing fibers are unidirectionally aligned is impregnated with a thermosetting resin composition, in an orientation direction of the reinforcing fibers.

It is known that the tape-like prepreg is used in which slit tapes whose width is controlled with specific accuracy are provided in parallel to each other at an interval that is less than a predetermined interval (see, for example, Patent Literature 1). The above predetermined interval is, for example, less than 1.00 mm.

A prepreg for a fiber-reinforced composite material which prepreg contains a reinforcing fiber and a matrix resin is widely used for sport, aerospace, and general industrial applications particularly in a case where the matrix resin is a thermosetting resin. This is because a cured product (fiber-reinforced composite material) of the thermosetting resin is lightweight and has excellent mechanical properties.

The fiber-reinforced composite material is produced by molding a prepreg laminate, formed by laminating a plurality of prepregs, by heating and pressurization with use of an autoclave or a pressing machine.

As a high-cycle molding method, a method is known in which a prepreg is molded such that a plurality of prepregs each containing a reinforcing fiber and a matrix resin are laminated, a preform is prepared from a laminate obtained, and then a fiber-reinforced composite material molded article is manufactured by subjecting the preform to heating and pressurization.

Patent Literature 2 discloses a method for manufacturing a fiber-reinforced composite material molded article by (i) laminating a plurality of prepregs, each having been cut into a predetermined shape, so as to obtain a laminate, (ii) applying a pressure to the laminate so as to obtain a premolded article (preform) having a stereoscopic shape, (iii) taking the premolded article out of a mold for a time, and (iv) subjecting the preform thus obtained to heating and pressurization with use of a press mold so as to obtain the fiber-reinforced composite material molded article. The above prepregs that are slit deform the laminate so as to cause the laminate to follow the stereoscopic shape.

CITATION LIST

Patent Literatures

[Patent Literature 1]
International Publication No. WO 2012/020109 (Publication Date: Feb. 16, 2012)
[Patent Literature 2]
International Publication No. WO 2004/018186 (Publication Date: Mar. 4, 2004)

SUMMARY OF INVENTION

Technical Problem

Note, however, that, in a case where a molded article having a three-dimensional shape is manufactured, as described earlier, with use of an aggregate of tape-like prepregs that are provided so as to have a gap or no gap therebetween, reinforcing fibers contained in the molded article thus obtained may have a worse appearance and a lower strength due to a gap therebetween. A conventional technique thus still has room for improvement in terms of an appearance and a strength that are obtained in a case where a fiber-reinforced composite material molded article is manufactured.

Furthermore, as shown in such a conventional technique as described earlier, in manufacturing a fiber-reinforced composite material molded article having a stereoscopic shape, problems such as a poor appearance and a lower strength commonly may occur due to a wrinkle remaining in the molded article. A conventional technique thus still has room for improvement in terms of an appearance and a strength that are obtained in a case where a fiber-reinforced composite material molded article is manufactured.

A first object of an aspect of the present invention is to achieve a prepreg sheet from which a fiber-reinforced composite material molded article having a good appearance and a high strength can be manufactured.

A second object of an aspect of the present invention is to achieve a fiber-reinforced composite material molded article having a good appearance and a high strength.

A third object of an aspect of the present invention is to provide a preform that allows a wrinkle and reinforcing fiber meandering to less occur during molding and that is highly moldable.

Solution to Problem

In order to attain at least the first object, a prepreg sheet in accordance with an aspect of the present invention includes: a plurality of prepreg tapes that are juxtaposed to each other and each of which contains a reinforcing fiber bundle and a matrix resin composition, the plurality of prepreg tapes being provided such that adjacent prepreg tapes of the plurality of prepreg tapes overlap each other at respective lateral edge portions of the adjacent prepreg tapes.

In order to attain at least the first object, a covering material-attached prepreg sheet in accordance with an aspect of the present invention includes: a covering material; and a prepreg sheet provided on the covering material, the prepreg sheet including a plurality of prepreg tapes that are juxtaposed to each other, the plurality of prepreg tapes each containing a reinforcing fiber bundle and a matrix resin composition, and the plurality of prepreg tapes being provided such that adjacent prepreg tapes of the plurality of prepreg tapes overlap each other at respective lateral edge portions of the adjacent prepreg tapes.

In order to attain at least the first object, a method for manufacturing a prepreg sheet in accordance with an aspect of the present invention includes: manufacturing the prepreg sheet by providing a plurality of prepreg tapes, in each of which a reinforcing fiber bundle is impregnated with a matrix resin composition, such that adjacent prepreg tapes of the plurality of prepreg tapes overlap each other at respective lateral edge portions of the adjacent prepreg tapes.

In order to attain at least the third object, a method for manufacturing a preform in accordance with an aspect of the present invention includes: obtaining a preform by preforming at least one prepreg sheet recited above, or a laminated sheet, which is a laminate including one or more of the at least one prepreg sheet.

In order to attain at least the second object, a method for manufacturing a fiber-reinforced composite material molded article in accordance with an aspect of the present invention is a method for manufacturing a molded article of a fiber-reinforced composite material by molding at least one prepreg sheet recited above, the matrix resin composition being a thermosetting resin composition, the method including: a preforming step of preparing a preform by preforming the at least one prepreg sheet or a laminated sheet, which is a laminate including one or more of the at least one prepreg sheet, into a shape that is close to a shape of the fiber-reinforced composite material molded article; and a molding step of curing the preform by subjecting the preform to heating and pressurization in a mold whose temperature is adjusted to a temperature higher than or equal to a curing temperature of the thermosetting resin composition.

In order to attain at least the third object, a method for manufacturing a preform in accordance with an aspect of the present invention includes: a first step of manufacturing a primary premolded article by placing, in a preform mold, one or more intermediate base materials and preforming the one or more intermediate base materials, the one or more intermediate base materials each containing a reinforcing fiber base material and a matrix resin composition; and a second step of manufacturing a secondary premolded article by placing the one or more intermediate base materials on the primary premolded article, which is placed in the preform mold, and preforming the primary premolded article and the one or more intermediate base materials.

Advantageous Effects of Invention

According to an aspect of the present invention, it is possible to achieve a prepreg sheet from which a fiber-reinforced composite material molded article having a good appearance and a high strength can be manufactured. According to an aspect of the present invention, it is possible to achieve a fiber-reinforced composite material molded article having a good appearance and a high strength.

According to an aspect of the present invention, it is possible to manufacture a preform from which a fiber-reinforced composite material molded article having a good appearance and a high strength can be manufactured.

DESCRIPTION OF EMBODIMENTS

[1-1. Prepreg Sheet]

A prepreg sheet in accordance with an embodiment of the present invention includes a plurality of prepreg tapes that are juxtaposed to each other and each of which contains a reinforcing fiber bundle and a matrix resin composition with at least part of which the reinforcing fiber bundle is impregnated. In the prepreg sheet, the plurality of prepreg tapes are provided such that adjacent prepreg tapes of the plurality of prepreg tapes overlap each other at respective lateral edge portions of the adjacent prepreg tapes. The matrix resin composition is a composition containing a matrix resin such as a thermosetting resin. Reinforcing fiber bundles can be provided in the prepreg sheet while a positional relationship is maintained in which the reinforcing fiber bundles overlap each other due to the prepreg tapes overlapping each other.

With the configuration, the prepreg sheet (i) allows a wrinkle and reinforcing fiber meandering to less occur during molding due to movement and/or deformation of the prepreg tapes and (ii) is highly moldable. With the configuration, the prepreg sheet also makes it possible to provide a fiber-reinforced composite material molded article having a good appearance and a high strength.

(Configuration of Prepreg Sheet and Laminated Sheet)

Figure 1:
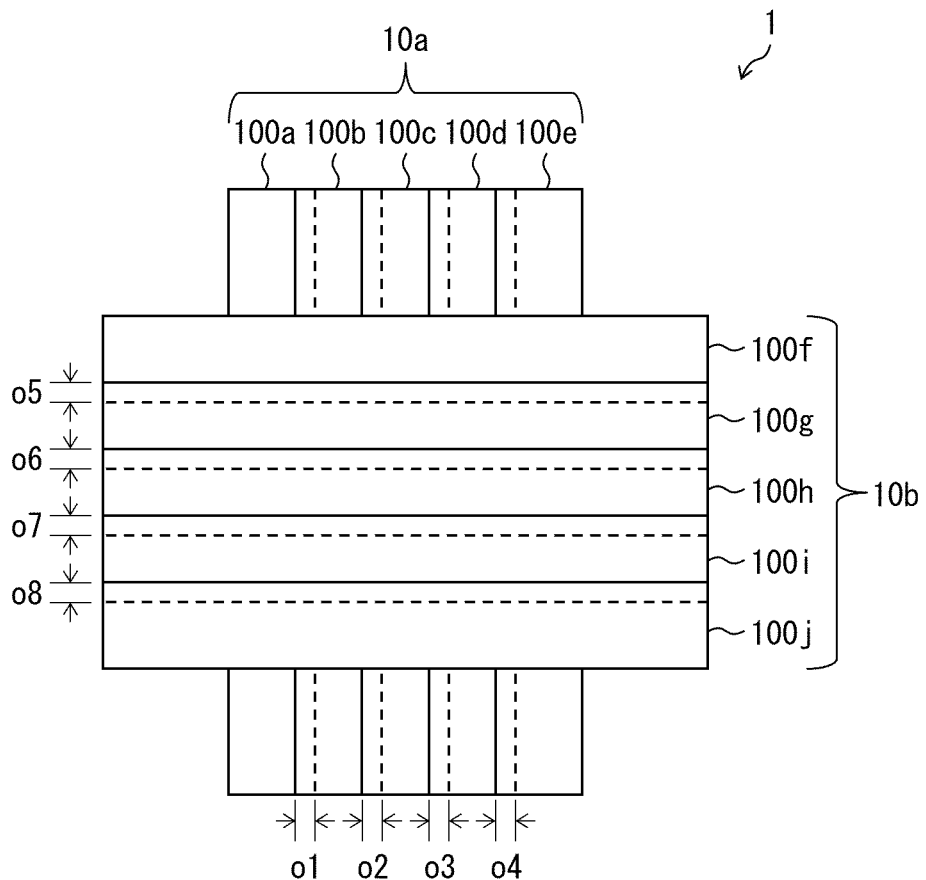
FIG. 1 is a view schematically illustrating an example of a configuration of a laminated sheet of an embodiment of the present invention.

The following description will specifically discuss, with reference to the drawings, a configuration of a laminated sheet 1 in accordance with a first embodiment of the present invention. FIG. 1 is a view schematically illustrating an example of a configuration of the laminated sheet 1. The laminated sheet 1 is a laminate of prepreg sheets and includes a prepreg sheet 10*a* and a prepreg sheet 10*b* that is placed on the prepreg sheet 10*a*. The prepreg sheet 10*a* and the prepreg sheet 10*b* are each constituted by a plurality of prepreg tapes 100 that are juxtaposed to each other. A "prepreg tape" will be described later in detail.

Note that in FIG. 1, reference signs denoting the prepreg sheets, the prepreg tapes, and overlapping lengths for which the prepreg tapes overlap each other are given respective alphabets (a to j) or numbers ("1 to 8" of the overlapping lengths) so as to be individually distinguished from each other. In the following description, the alphabets or numbers may be omitted in a case where the prepreg sheets, the prepreg tapes, or the overlapping lengths do not need to be individually distinguished from each other.

In each of the prepreg sheet 10*a* and the prepreg sheet 10*b*, the plurality of prepreg tapes 100 are provided such that adjacent prepreg tapes 100 of the plurality of prepreg tapes 100 overlap each other at respective lateral edge portions of the adjacent prepreg tapes 100. More specifically, the prepreg sheet 10*a* is constituted by five prepreg sheets 100*a* to 100*e* each of which overlaps with a corresponding adjacent prepreg tape 100. The prepreg sheet 10*b* is also constituted, as in the case of the prepreg sheet 10*a*, by five prepreg sheets 100*f* to 100*j* each of which overlaps with a corresponding adjacent prepreg tape 100.

The prepreg sheet 10*a* and the prepreg sheet 10*b* are adjacent to each other in a lamination direction. It is not limited how the prepreg sheets 10*a* and 10*b* are laminated in the laminated sheet 1. For example, these prepreg sheets 10 are provided so that the prepreg tapes 100 of the prepreg sheet 10*a* intersect with the prepreg tapes 100 of the prepreg sheet 10*b* when the prepreg sheets 10 are viewed from above. More specifically, the prepreg sheet 10*a* and the prepreg sheet 10*b* are provided so that an orientation direction of the prepreg tapes 100 of the prepreg sheet 10*a* is orthogonal to an orientation direction of the prepreg tapes 100 of the prepreg sheet 10*b* when the prepreg sheet 10*a* and the prepreg sheet 10*b* are viewed from above.

Figure 2:
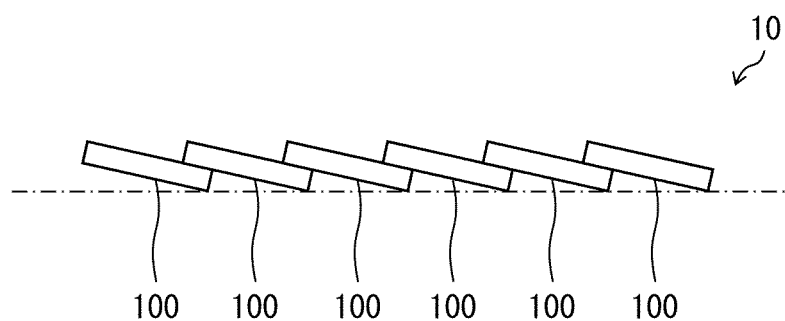
FIG. 2 is a view schematically illustrating an example of how to arrange prepreg tapes of a prepreg sheet in accordance with an embodiment of the present invention.

In each of these prepreg sheets 10*a* and 10*b*, the prepreg tapes 100 are provided so that a lateral edge portion of one of the prepreg tapes 100 is overlapped, from above, by a lateral edge portion of the other one of the prepreg tapes 100 (see, for example, FIG. 2). More specifically, the prepreg tapes 100*b* to 100*e* overlap respective lateral edge portions of the prepreg tapes 100*a* to 100*d* for respective overlapping lengths o1 to o4. The prepreg tapes 100*g* to 100*j* overlap respective lateral edge portions of the prepreg tapes 100*f* to 100*i* for respective overlapping lengths o5 to o8.

Note that FIG. 2 schematically illustrates a cross section of a prepreg tape 100. A rectangle illustrated in FIG. 2 shows (i) a cross section of a reinforcing fiber bundle with which the rectangle is filled and (ii) a thermosetting resin composition with which the reinforcing fiber bundle is impregnated. Specifically, as in the case of the prepreg tapes 100, reinforcing fiber bundles contained in each of the prepreg tapes 100 are also provided so that a lateral edge portion of a reinforcing fiber bundle contained in one of the prepreg tapes 100 is overlapped, from above, by a lateral edge portion of a reinforcing fiber bundle contained in the other one of the prepreg tapes 100. The reinforcing fiber bundles are thus provided in the prepreg sheet 10 while a positional relationship is maintained in which the reinforcing fiber bundles overlap each other due to the prepreg tapes 100 overlapping each other. This point also applies to FIG. 4. Note that a difference in level caused by the prepreg tapes 100 overlapping each other as described earlier disappears in a case where during press molding (described later), the prepreg tapes move and fibers of the reinforcing fiber bundles contained in the prepreg tapes move.

The overlapping lengths o1 to o8 that are each too short may separate the prepreg tapes during handling of the prepreg sheet. This may cause a deterioration in handleability of the prepreg sheet. The above overlapping lengths that are each too long may cause an increase in number of prepreg tapes 100 that occupy a predetermined planar shape of the laminated sheet 1. This may cause a reduction in productivity and an increase in weight of a molded article.

Note that the "overlapping length" means a length for which the prepreg tapes 100 overlap each other and means an overlapping length of a certain prepreg tape 100 at one of both side portions of the certain prepreg tape 100 in a case where the certain prepreg tape 100 overlaps the other two prepreg tapes 100 at the respective both side portions.

In order to achieve such a sufficiently good appearance as described earlier, the overlapping length is preferably not less than 0.5%, more preferably not less than 1%, still more preferably not less than 3%, and particularly preferably not less than 4% of a width of a prepreg tape 100. In addition, in terms of productivity, the overlapping length is preferably not more than 50%, more preferably not more than 40%, and still more preferably not more than 30% of the width of the prepreg tape 100.

In order to make the prepreg sheet easy enough to handle, the overlapping length is preferably not less than 0.5 mm, and more preferably not less than 1.0 mm. In order to make the preform sufficiently moldable, the overlapping length is preferably not more than 6.0 mm, and more preferably not more than 3.0 mm.

Note that the number of prepreg tapes 100 constituting a single prepreg sheet 10 in the laminated sheet 1 can be determined as appropriate in accordance with the intended size of the laminated sheet 1 and the width of the prepreg tapes 100 to be laid.

The thickness of the laminated sheet 1 can be determined as appropriate in accordance with moldability during manufacturing of the fiber-reinforced composite material molded article (described later). For example, the laminated sheet 1 preferably has a thickness falling within a range of 0.03 mm to 6 mm.

The laminated sheet 1 that has a thickness of not less than 0.03 mm is preferable in terms of excellent shape retainability of a preform (described later). The thickness of the laminated sheet 1 has a lower limit of more preferably not less than 0.2 mm, and still more preferably not less than 0.4 mm.

In addition, the laminated sheet 1 that has a thickness of not more than 6 mm is preferable in terms of (i) excellent preformability of a preform and (ii) a reduction in occurrence of a wrinkle in a molded article to be obtained. The thickness of the laminated sheet 1 has an upper limit of more preferably not more than 5 mm, and still more preferably not more than 4 mm.

The prepreg sheet 10 can be debulked. A method for debulking the prepreg sheet will be described later. In a case where the prepreg sheet is debulked, the prepreg tape 100a and the prepreg tape 100b more securely adhere to each other while a positional relationship is maintained in which the reinforcing fiber bundles overlap each other due to the prepreg tapes 100 overlapping each other.

The laminated sheet 1 can also be debulked. In a case where the laminated sheet 1 is debulked, a laminated sheet 10a and a laminated sheet 10b more securely adhere to each other while a positional relationship is maintained in which the reinforcing fiber bundles overlap each other due to the laminated sheets 1 overlapping each other.

In the prepreg sheet 10, the prepreg tapes 100 only need to overlap each other. Note, however, that the prepreg sheet 10 that has a suitable overlapping width of the prepreg tapes 100 is preferable so that the prepreg sheet 10 will be easily handled as a sheet. The overlapping width of the prepreg tapes 100 of the prepreg sheet 10 can be thus set as appropriate so that the prepreg sheet 10 will be integrated sufficiently enough to handle as a single sheet. It can be confirmed by, for example, the method described below, that the prepreg sheet 10 is integrated sufficiently enough to handle as a single sheet.

First, a test piece that (i) has a side that is substantially parallel to the orientation direction of the prepreg tapes 100 and (ii) has a square planar shape having a length of 15 cm and a width of 15 cm is cut out from the prepreg sheet 10. Subsequently, a side edge portion including the side is lifted so that the side of the test piece is made horizontal. In a case where the test piece that is lifted maintains, for a desired time, e.g. not less than 30 seconds, a shape that the test piece had before being lifted, it can be determined that the prepreg sheet 10 is integrated sufficiently enough to handle as a single sheet. The test piece that can maintain, for not less than 30 seconds, a shape that the test piece had before being lifted is preferable so that a prepreg sheet that has sheet self-sustainability will be achieved. A direction in which the side of the "side that is substantially parallel to the orientation direction of the prepreg tapes 100" extends can be a direction in which the side substantially cuts none of the reinforcing fiber bundles of the prepreg tapes 100 in at least one of orientation directions of the prepreg tapes 100. From such a viewpoint, an angle θ formed by at least one of (i) the orientation directions of the prepreg tapes 100 and (ii) the side is, for example, preferably $0° \leq θ \leq 5°$, more preferably $0° \leq θ \leq 3°$, and still more preferably $0° \leq θ \leq 2°$.

The prepreg sheet that has sheet self-sustainability refers to, for example, a sheet in which adjacent prepreg tapes of a prepreg sheet sufficiently overlap each other so that the prepreg sheet is integrated. The prepreg sheet that has sheet self-sustainability can also be expressed as a prepreg sheet that has sheet integrity.

(Configuration of Prepreg Tape)

A prepreg tape 100 preferably has a width falling within a range of 3 mm to 55 mm. The prepreg tape that has a width of not less than 3 mm is preferable so that a prepreg sheet will be manufactured with high efficiency. The width of the prepreg tape 100 has a lower limit that is more preferably not less than 5 mm, and still more preferably not less than 6 mm.

The prepreg tape 100 that has a width of not more than 55 mm is preferable in terms of an increase in yield of the prepreg tape 100 regardless of a planar shape for laying the prepreg tape 100. The width of the prepreg tape 100 has an upper limit that is more preferably not more than 40 mm, and still more preferably not more than 30 mm.

The prepreg tapes 100 of a single prepreg sheet 10 can be identical or different in width. In a case where the prepreg tapes 100 are different in width, the overlapping length is based on one of adjacent prepreg tapes 100 which one is narrower than the other of the adjacent prepreg tapes 100. Specifically, in a case where the prepreg tapes 100 are different in width, the overlapping length is, for example, 1% to 50% of a width of one of adjacent prepreg tapes which one is narrower than the other of the adjacent prepreg tapes. In order to allow a prepreg sheet to have shape retainability and allow a preform and a fiber-reinforced composite material molded article to be strong enough, the overlapping length is preferably defined as described above based on a width of a narrower one of the prepreg tapes 100 of a single prepreg sheet which prepreg tapes 100 are different in width.

In order to easily control arrangement (overlapping) of the prepreg tapes 100, the prepreg tapes 100 of a single prepreg sheet 10 are preferably identical in width.

In order to allow a prepreg sheet to be designed in accordance with a molded article having a three-dimensional shape, the prepreg tapes 100 of a single prepreg sheet 10 are preferably different in width.

Note that the width of a prepreg tape 100 only needs to have a value that represents width direction dimensions of each of the prepreg tapes 100. For example, the width of the prepreg tape 100 can have an average value of the width direction dimensions measured at any three points including both longitudinal direction (orientation direction) ends of the prepreg tape 100. Alternatively, the width of the prepreg tape 100 can have an average value of a maximum value and a minimum value of the width direction dimensions of each of the prepreg tapes 100.

The width of the prepreg tape 100 can slightly vary provided that the overlapping length described earlier can be achieved. For example, a tow prepreg described later may vary in width due to a method for manufacturing the tow prepreg. Such a variation that is excessively large may make it impossible to achieve such overlapping as described earlier. Such a variation that is smaller is preferable in terms of accuracy, but may cause an increase in manufacturing cost of the prepreg tape 100.

The variation in width of the prepreg tape depends on the size of the width of the prepreg tape. For example, in a case where the width is 12.7 mm, the variation is preferably not more than ±0.7 mm, and more preferably not more than ±0.4 mm. Note, however, that the variation in width of the prepreg tape is not limited to the above example because the variation also depends on the size of the width of the prepreg tape. A carbon fiber bundle infrequently may include a twist, and a twisted part of the prepreg tape may locally have a smaller width. Note, however, that such a change in width is excluded from the variation.

The prepreg tape 100 is a tape-like intermediate base material in which a reinforcing fiber bundle is impregnated with a matrix resin composition such as a thermosetting resin composition. The prepreg tape 100 can be a known intermediate base material, provided that the known intermediate base material is such a tape-like intermediate base material as described above. The prepreg tape 100 can be, for example, a tow prepreg or a slit tape.

(Slit Tape)

The slit tape is a tape-like intermediate base material obtained by slitting, in an orientation direction of reinforcing fibers, a sheet-like prepreg that is impregnated with a matrix resin composition such as a thermosetting resin composition in a state in which reinforcing fiber bundles are unidirectionally aligned. The slit tape is, for example, a narrow intermediate base material obtained by cutting an ordinary unidirectional prepreg into a strip shape with use of a slitter, and then winding the prepreg thus cut on a bobbin such as a paper tube.

(Method for Manufacturing Slit Tape)

A slit tape can be prepared by cutting, into a strip shape with use of a dedicated slitter, a sheet-like unidirectional prepreg that is impregnated with a matrix resin composition such as a thermosetting resin composition in a state in which reinforcing fiber bundles are unidirectionally aligned. Examples of a method for manufacturing the unidirectional prepreg include a hot melt method. According to the hot melt method, a matrix resin composition (e.g. a thermosetting resin composition) that has been made into a film is attached to reinforcing fiber bundles that are unidirectionally aligned, and then the reinforcing fiber bundles are impregnated with the matrix resin composition (e.g. a thermosetting resin composition) by heating and pressurization.

(Tow Prepreg)

A tow prepreg is a tape-like intermediate base material in which continuous reinforcing fiber bundles are impregnated with a matrix resin composition such as a thermosetting resin composition. The tow prepreg is, for example, a narrow intermediate base material obtained by impregnating, with a thermosetting resin, a reinforcing fiber bundle including thousands to tens of thousands of filaments that are unidirectionally arranged, and then winding the reinforcing fiber bundle on a bobbin such as a paper tube. As described earlier, the slit tape is manufactured, after the prepreg is manufactured, through a step (a slitting step) of slitting the prepreg with use of a slitter. This entails cost of introduction of the slitter and cost of the slitting step. In contrast, the tow prepreg requires no slitting step and thus can be manufactured at low cost. For this reason, the tow prepreg is useful as an intermediate base material for manufacturing a fiber-reinforced composite material molded article (e.g. an automobile member) that is required to be manufactured with high productivity.

The tow prepreg has a cross section whose shape is not limited to any particular shape, but is, for example, a substantially elliptical shape. The slit tape commonly has a substantially rectangular cross section because the slit tape is manufactured by cutting a planar prepreg. In contrast, according to the tow prepreg, a carbon fiber tow is impregnated with a low viscosity resin without application of any pressure in a case where a thermosetting resin composition is used. Thus, the shape of the carbon fiber tow that is unwound is substantially maintained. This causes such a difference in cross-sectional shape. The tow prepreg that has a substantially elliptical cross section makes it possible to achieve a thin overlapping part during manufacturing of a prepreg sheet of an aspect of the present invention which prepreg sheet has an overlap. This reduces a difference in level in the prepreg sheet. This allows the difference in level to be easily overcome in a molding step, so that a molded article that has a good appearance can be conveniently obtained. Thus, the tow prepreg is preferably used as the prepreg tape.

(Method for Manufacturing Tow Prepreg)

The tow prepreg can be prepared by impregnating the reinforcing fiber bundle with the matrix resin composition such as a thermosetting resin composition. The thermosetting resin composition can be supplied to the reinforcing fiber bundle by a known method. Examples of such a method for supplying the thermosetting resin composition include a resin bath method, a rotating roll method, an on-paper transfer method, and a nozzle dropping method.

According to the resin bath method, a reinforcing fiber bundle (tow) is impregnated with a thermosetting resin composition by being caused to pass through a resin bath in which the thermosetting resin composition is stored, and then an excess thermosetting resin composition is squeezed with use of an orifice, a roll, or the like, so that a resin content in the reinforcing fiber bundle is adjusted. The rotating roll method is a transfer roll impregnation method in which a thermosetting resin composition layer is formed on a rotating roll and transferred to a tow. Examples of the rotating roll method include an impregnation method carried out with use of a rotating drum having a doctor blade.

According to the on-paper transfer method, a thermosetting resin composition layer is formed on paper and transferred to a tow. The nozzle dropping method is disclosed in each of publications such as Japanese Patent Application Publication Tokukaihei No. 09-176346, Japanese Patent Application Publication Tokukai No. 2005-335296, and Japanese Patent Application Publication Tokukai No. 2006-063173.

Among the above methods, the rotating roll method is preferable in terms of (i) control of an amount of a thermosetting resin composition supplied and (ii) easiness to carry out. The reinforcing fiber bundle is preferably uniformly impregnated with the thermosetting resin composition in terms of (i) a reduction in void in a molded article and (ii) prevention or reduction of a deterioration in physical property.

(Material of Prepreg Tape)

The prepreg tape 100 contains the reinforcing fiber bundle and the matrix resin composition as described earlier. The prepreg tape 100 can further contain other material(s) in addition to the reinforcing fiber bundle and the matrix resin composition, provided that an effect of the present embodiment is brought about. Examples of such other material(s) include a mold release agent, a defoaming agent, an ultraviolet absorber, and a filler.

(Reinforcing Fiber Bundle)

The reinforcing fiber bundle is a bundle of a plurality of reinforcing fibers. The reinforcing fiber bundle includes 1000 filaments to 100000 filaments, preferably 1000 filaments to 60000 filaments, and more preferably 3000 filaments to 50000 filaments. The reinforcing fiber bundle that includes not less than 1000 filaments is preferable in terms of an increase in productivity during automatic lamination of the filaments in a form of a tow prepreg. The reinforcing fiber bundle that includes not more than 60000 filaments is preferable in terms of facilitation of impregnation of the reinforcing fiber bundle with the matrix resin composition.

The filaments are preferably untwisted in terms of a tendency for unevenness of a surface of the laminated sheet 1 to be reduced. A filament that has a twist therein is twisted preferably not more than 5 times/m, and more preferably not more than 2 times/m.

(Reinforcing Fiber)

The reinforcing fibers can be reinforcing fibers used for an ordinary fiber-reinforced composite material. The reinforcing fibers can be selected as appropriate in accordance with a purpose for which a prepreg sheet is to be used, such as desired physical properties of a fiber-reinforced composite material molded article (described later).

The reinforcing fibers have a thickness falling within a range of 1 μm to 20 μm, and more preferably a range of 3 μm to 10 μm, in terms of a filament diameter. The reinforcing fibers that have a thickness of not more than 20 μm are preferable in terms of an increase in tensile strength and in tensile elastic modulus. The reinforcing fibers that have a thickness of not less than 1 μm allow (i) an increase in productivity of the reinforcing fiber bundle and (ii) a reduction in manufacturing cost.

The reinforcing fibers can be of a single kind or can be of two or more kinds. Examples of the reinforcing fibers include glass fibers, carbon fibers, aramid fibers, high-strength polyester fibers, boron fibers, alumina fibers, silicon nitride fibers, and nylon fibers. Note that the carbon fibers also include graphite fibers.

Among the above fibers, the carbon fibers are preferable because they are lightweight, have a high strength and a high elastic modulus, and are excellent in heat resistance and chemical resistance. Examples of types of the carbon fibers include types such as pitch-based carbon fibers, polyacrylonitrile (PAN)-based carbon fibers, and rayon-based carbon fibers. The carbon fibers can be of any of these types. The PAN-based carbon fibers are more preferable in terms of productivity of the carbon fibers.

In addition, approximately 0.01 mass % to 5 mass % of a substance having a predetermined functional group can be attached to the carbon fibers in terms of convergence of a carbon fiber bundle or in terms of an improvement in adhesion between the carbon fibers and a thermosetting resin during manufacturing of the fiber-reinforced composite material molded article. The predetermined functional group can be of a single kind or can be of two or more kinds. Examples of the predetermined functional group include an epoxy group, a hydroxyl group, an amino group, a carboxyl group, a carboxylic acid anhydride group, an acrylate group, and a methacrylate group.

The carbon fibers that are high-strength carbon fibers are suitable for development of strength of a fiber-reinforced composite material. The high-strength carbon fibers have (i) a strand tensile strength of not less than 4 GPa, and preferably not less than 4.6 GPa and (ii) a tensile elongation of not less than 1.5%. Note here that the strand tensile strength refers to a strength measured by a strand tensile test that is carried out based on JIS R7601(1986).

(Matrix Resin Composition)

The matrix resin composition contains a matrix resin.

(Matrix Resin)

The matrix resin is not limited to any particular matrix resin. As the matrix resin, a thermoplastic resin and/or a thermosetting resin can be used.

In the following description, the matrix resin composition in which a thermoplastic resin is used as the matrix resin is referred to as a thermoplastic resin composition, and the matrix resin composition in which a thermosetting resin is used as the matrix resin is referred to as a thermosetting resin composition. The thermosetting resin composition contains a thermosetting resin and a curing agent.

The thermoplastic resin is in a highly viscous liquid state by being heated, and can be freely deformed by an external force. In a case where the external force is removed by cooling the thermoplastic resin, the thermoplastic resin is in a solid state, and maintains its shape. In addition, such a process can be repeatedly carried out. The thermoplastic resin is not particularly limited, and can be selected as appropriate, provided that the thermoplastic resin does not cause any serious deterioration in mechanical property that a molded article is required to have. Examples of the thermoplastic resin that can be used include polyolefin-based resins such as a polyethylene resin and a polypropylene resin, polyamide-based resins such as a nylon 6 resin and a nylon 6,6 resin, polyester-based resins such as a polyethylene terephthalate resin and a polybutylene terephthalate resin, a polyphenylene sulfide resin, a polyether ketone resin, a polyether sulfone resin, and an aromatic polyamide resin. Among the above resins, any one of a polyamide resin, a polypropylene resin, and a polyphenylene sulfide resin is preferable in terms of physical properties and/or a price. One of the above resins can be used alone, or two or more thereof can be used in combination.

The thermosetting resin is a reactive polymer in which a curing reaction caused by intermolecular crosslinking progresses under the action of heat or a catalyst and an insoluble and infusible three-dimensional mesh structure is obtained. The thermosetting resin is also not particularly limited, and can be selected as appropriate, provided that the thermosetting resin does not cause any serious deterioration in mechanical property that a molded article is required to have. Examples of the thermosetting matrix resin include an epoxy resin, an unsaturated polyester resin, an acrylic resin, a vinyl ester resin, a phenolic resin, a phenoxy resin, an alkyd resin, an urethane resin, a maleimide resin, a cyanate resin, a benzoxazine resin, an epoxy acrylate resin, and an urethane acrylate resin. One or more of the above resins can be selected as appropriate and used as the thermosetting resin. Among the above resins, an epoxy resin is preferable because the epoxy resin makes it possible to obtain a high-strength cured product.

A heat characteristic and a type of the thermosetting resin can be selected as appropriate in accordance with a purpose for which the fiber-reinforced composite material molded article is to be used. For example, the fiber-reinforced composite material molded article for use in an automobile product is required to have high productivity and high physical properties. This requires fast curing characteristics and heat resistance.

In manufacturing an automobile molded article such as an automobile member, (i) fast curing characteristics for achievement of a shorter resin curing time and (ii) heat resistance for an improvement in workability with which to take out a molded product from a mold without causing any distortion are required so that the automobile molded article will be manufactured with sufficient productivity. A glass transition temperature (Tg) of the thermosetting matrix resin composition that has been cured only needs to be high enough to have a rigidity that is necessary and sufficient at a molding temperature. The glass transition temperature is preferably higher than or equal to 100° C., and more preferably higher than or equal to 120° C. A higher Tg is preferable from the above viewpoint. The Tg has an upper limit that is not determined from the above viewpoint but is preferably lower than or equal to a thermal decomposition temperature of the thermosetting matrix resin. In a case where the thermosetting resin is an epoxy resin, the Tg is preferably lower than or equal to 300° C. because the epoxy resin has a heat decomposition temperature of approximately 300° C. A higher Tg tends to make the molding temperature higher and make a molding time longer. Note, however, that the Tg that is lower than or equal to 300° C. allows short-time curing (high-cycle molding).

In addition, examples of thermosetting resins used for an automobile product include an epoxy resin, a phenolic resin, a cyanate resin, an isocyanate resin, an unsaturated imide resin, an amino resin, an unsaturated polyester resin, an allyl resin, a dicyclopentadiene resin, a silicone resin, and a melamine resin. Among the above resins, an epoxy resin is preferable due to its exhibition of sufficient fast curing characteristics and a sufficient mechanical strength.

A curing agent for the thermosetting resin that is, for example, an epoxy resin is preferably an amine compound, an urea compound, or an imidazole compound so that the thermosetting resin will exhibit fast curing characteristics. The curing agent is more preferably such compounds that are combined and mixed in any amount. From the viewpoint of reactivity and storage stability, the curing agent is preferably added in an amount of 1 part by mass to 15 parts by mass, and more preferably 2 parts by mass to 10 parts by mass, with respect to 100 parts by mass of an epoxy resin contained in a composition containing the epoxy resin and the curing agent.

The thermosetting resin composition can be a thermosetting resin composition that has a viscosity of not less than 10000 Pa·s at 30° C. The viscosity is preferably not less than 10000 Pa·s, and more preferably not less than 15000 Pa·s. In addition, the thermosetting resin composition can be a thermosetting resin composition that has a viscosity of not more than 100000 Pa·s at 30° C. The viscosity is preferably not more than 50000 Pa·s, and more preferably 35000 Pa·s. The viscosity that is set to a value not less than the above lower limit is preferable so that the tow prepreg that has a moderate hardness will be obtained. The viscosity that is set to a value not more than the above upper limit is preferable so that the tow prepreg will be smoothly wound on the bobbin. Note that the term "viscosity" means a value measured by temperature rise viscosity measurement. The temperature rise viscosity measurement was carried out with use of a parallel plate, having a diameter of 25 mm, in AR-62 (manufactured by TA Instruments, Inc.) and under conditions of a plate gap of 0.5 mm, a measurement frequency of 10 rad/sec, a rate of temperature increase of 2.0° C./min, and a stress of 300 Pa.

The viscosity of the thermosetting resin composition can be determined as appropriate in accordance with a type of the prepreg tape. For example, the thermosetting resin composition that is used in the prepreg has a viscosity of preferably not more than 100 Pa·s, and preferably not more than 10 Pa·s, at 70° C. so that the reinforcing fiber will be rapidly and sufficiently infiltrated into the thermosetting matrix resin during manufacturing of the tow prepreg. The thermosetting matrix resin that is used in the tow prepreg has a viscosity of preferably not less than 0.1 Pa·s, and more preferably not less than 1 Pa·s, at 70° C. so that the thermosetting matrix resin will not only have such a good infiltration property as described above but also be handleable while being processed into a sheet and so that the thermosetting matrix resin will exhibit a sufficient mechanical strength after being heat-cured.

In addition, in the temperature rise viscosity measurement in which the thermosetting resin composition that is used in an aspect of the present invention is heated at a rate of 2.0° C./minute, a minimum viscosity is preferably not less than 0.3 Pa·s, and more preferably not less than 0.5 Pa·s. The minimum viscosity is preferably not more than 20 Pa·s. The minimum viscosity that is not less than the above lower limit is preferable so that a resin will flow in a smaller amount during press molding and so that a fiber-reinforced composite material to be obtained will be prevented from having a poor appearance (e.g. having an uneven surface and/or having a resin-deficient part). The minimum viscosity that is not more than the above upper limit is preferable so that a resin will flow in an appropriate amount during press molding and so that occurrence of a failure such that every corner of the mold is not filled with the matrix resin composition will be prevented.

The minimum viscosity is preferably exhibited at a temperature falling within a range of 100° C. to 120° C. The minimum viscosity that is exhibited at a temperature higher than or equal to 100° C. is preferable so that an excessively reduced amount of resin flow during press molding will not prevent the matrix resin composition from spreading into a molded article. The minimum viscosity that is exhibited at a temperature lower than or equal to 120° C. is preferable in terms of a reduction in amount of resin flow during press molding.

A curing completion time at 140° C. of the thermosetting resin composition as measured with use of a curelastometer (Registered Trademark) is preferably 2.0 minutes to 15.0 minutes, more preferably 2.0 minutes to 10.0 minutes, and still more preferably 2.0 minutes to 8.0 minutes.

<Evaluation and evaluation method>

In the measurement with use of the curelastometer, a test is carried out in accordance with JIS K6300, which is the industrial standard for a rubber vulcanization test. In this case, a cyclic frequency is 100 cpm, an amplitude angle is ±¼°, and a die shape is WP-100.

A torque-time curve outputted by the curelastometer is a curve that is obtained assuming that a vertical axis shows a measured torque and a horizontal axis shows a time. In general, a torque increases as a curing reaction of a resin progresses, and the torque reaches saturation when the curing reaction is coming to an end.

The curing completion time of an aspect of the present invention is assumed to be a time for which a gradient of a tangent to the torque-time curve reaches a maximum value and then reaches a value that is ¹⁄₂₀ of the maximum value.

In a case where the curing completion time at 140° C. as measured with use of the curelastometer is not more than the above upper limit, since the thermosetting resin composition that is used in an aspect of the present invention is highly curable, a press mold can be used for press molding for a shorter time. This makes it possible to accelerate a molding cycle. In a case where the curing completion time at 140° C. as measured with use of the curelastometer is not less than the above lower limit, there is time for a resin to flow. This allows the resin to sufficiently spread into a molded article.

(Resin content of prepreg tape)

The prepreg tape has a resin content of preferably 20 mass % to 45 mass %, and more preferably 25 mass % to 40 mass %. The resin content that is not less than 20 mass % is preferable so that voids in a fiber-reinforced composite material to be obtained will be reduced. The resin content that is not more than 45 mass % is preferable so that a fiber-reinforced composite material to be obtained will have higher mechanical properties and so that the prepreg tape will be prevented from being too tacky.

The thermosetting resin composition can further contain other component(s) in addition to the thermosetting resin (described earlier) and the curing agent (described earlier), provided that the effect of the present embodiment is brought about. The other component(s) can be of a single kind or can be of two or more kinds. Examples of the other component (s) include an auxiliary curing agent, a mold release agent, a defoaming agent, an ultraviolet absorber, and a filler.

An amount of the other component(s) contained in the thermosetting resin composition can be determined as appropriate, provided that an effect of the other component(s) together with the effect of the present embodiment is sufficiently exhibited.

The expression "a desired overlapping length of prepreg tapes" during curing means a length for which the reinforcing fiber bundles can be provided, in the prepreg sheet that has not been cured, while a positional relationship is maintained in which the reinforcing fiber bundles overlap each other due to the prepreg tapes 100 overlapping each other. As described earlier, "a desired overlapping length of prepreg tapes" is, for example, 1% to 50% of a width of a prepreg tape or 0.5 mm to 6.0 mm.

[1-2. Method for Manufacturing Prepreg Sheet]

A prepreg sheet 10 is manufactured by juxtaposing a plurality of prepreg tapes 100.

(Prepreg Sheet Preparing Step)

In the prepreg sheet preparing step, the plurality of prepreg tapes 100 are provided such that adjacent prepreg tapes 100 of the plurality of prepreg tapes overlap each other for the length (described earlier).

In order that the adjacent prepreg tapes 100 overlap each other as described earlier, the prepreg sheet 10 is prepared by laying the plurality of prepreg tapes 100 two-dimensionally. Furthermore, on the prepreg sheet 10 thus prepared, the laminated sheet 1 of prepreg sheets can be manufactured as appropriate by repeatedly carrying out the prepreg sheet preparing step a plurality of times. The prepreg sheets are constituted by a certain prepreg sheet 10 and a further prepreg sheet 10 provided on the certain prepreg sheet 10. The laminated sheet 1 can be alternatively prepared by manufacturing a plurality of prepreg sheets and then laminating the prepreg sheets obtained.

It is preferable to carry out the prepreg sheet manufacturing step by heating the prepreg tapes 100. The prepreg tapes 100 that are heated can be laminated while having adhesiveness. Such heating is preferably carried out so that release of the prepreg tapes 100 will be prevented from occurring in the laminated sheet 1.

The prepreg sheet manufacturing step can be manually carried out. Alternatively, the prepreg sheet manufacturing step can be carried out with use of an automatic laminating device (automated tape placement (ATP) device). The prepreg tapes 100 can be automatically laminated with use of the automatic laminating device. Thus, use of the automatic laminating device is preferable so that the laminated sheet 1 will be manufactured with high efficiency.

As the automatic laminating device, a known device can be used. In addition, it is also possible to manually preparing the prepreg sheet with use of a known drum winding device. In order to prevent or reduce peeling of the prepreg tapes 100 that have been laminated, the automatic laminating device and the drum winding device preferably have a function of heating a place at which to place the prepreg tapes 100.

The prepreg sheet manufacturing step can be carried out on a covering material. This makes it possible to manufacture a covering material-attached prepreg sheet that further includes the covering material on both surfaces or either one of the both surfaces thereof. A prepreg sheet of the covering material-attached prepreg sheet can be a laminated sheet.

Examples of the covering material include a flexible film, release paper (also referred to as a "backing paper") having adhesion and releasability to/from the prepreg sheet, and metal foil such as an aluminum foil. The flexible film can be selected as appropriate from known resin films, provided that a selected film not only has flexibility but also has both adhesion and releasability to/from the prepreg tapes. Examples of the flexible film include a polyethylene terephthalate film, a polypropylene film, a polyimide film, an aramid film, and a polyethylene naphthalate film. The flexible film is preferably a polyethylene film due to its flexibility and releasability. In addition, the flexible film preferably has a thickness of 10 μm to 100 μm so that (i) a wrinkle in the film will less affect a sheet and (ii) the film will be adequately stiff enough to exhibit shape retainability.

(Debulking Step)

A method for manufacturing the laminated sheet 1 can include a step of debulking the laminated sheet 1 that has been manufactured through the prepreg sheet manufacturing step. The laminated sheet 1 is preferably debulked so that the prepreg tapes 100 will be retained at an appropriate position in the laminated sheet 1.

The laminated sheet 1 is preferably debulked by a method in which the prepreg tapes 100 are not heated and that prevents the reinforcing fibers from meandering in the prepreg sheet 10. Examples of such a debulking method include a method in which the laminated sheet 1 is provided on a flat tool, an elastic sheet such as a rubber film is provided on top of the laminated sheet 1, and then the rubber film is pressure-bonded to the laminated sheet 1 by carrying out vacuuming from the laminated sheet 1 side. The debulking step (i) allows prepreg sheets to more securely adhere to each other and (ii) makes it possible to substantially maintain a state of aggregation of the reinforcing fiber bundles in the prepreg tapes 100.

(Application of Prepreg Sheet)

As described earlier, the laminated sheet 1 excels in following the shape of a mold. Thus, the laminated sheet 1 is suitable as a material for a fiber-reinforced composite material that is used to manufacture a molded article having a complicated shape, such as an automobile component.

(Variation of Prepreg Sheet)

Note that orientation directions of the prepreg tapes in a single monolayer can be identical to or different from each other. The orientation directions of the prepreg tapes in a single prepreg sheet are preferably configured to be substantially identical to each other and substantially parallel to each other. Such a configuration is preferable so that the prepreg sheet can have both productivity and desired physical properties. The orientation directions of the reinforcing fibers of the reinforcing fiber bundles in the prepreg tapes can be identical to or different from the orientation directions of the prepreg tapes, and are preferably substantially identical to the orientation directions of the prepreg tapes. A configuration in which the orientation directions of the reinforcing fibers are substantially identical to the orientation directions of the prepreg tapes is preferable. This is because such a configuration makes it possible to easily manufacture a high-strength product while utilizing continuous filament characteristics.

Note that not all the prepreg tapes of the prepreg sheet need to overlap each other.

Figure 4:
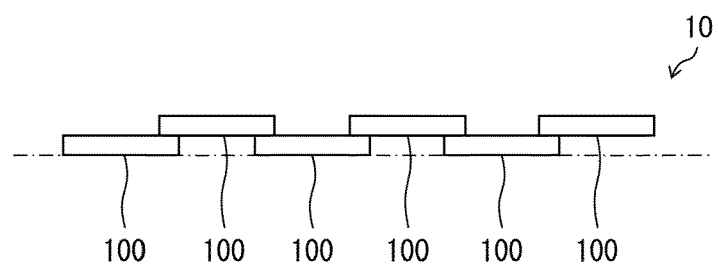
FIG. 4 is a view schematically illustrating another example of how to arrange the prepreg tapes of the prepreg sheet in accordance with an embodiment of the present invention.

Note also that the prepreg tapes of the prepreg sheet do not need to be overlap each other in a manner illustrated in FIG. 2, i.e., in a manner in which the other one of adjacent prepreg tapes overrides a lateral edge portion of one of the adjacent prepreg tapes. The prepreg tapes of the prepreg sheet can alternatively overlap each other in a manner illustrated in FIG. 4. FIG. 4 is a view schematically illustrating another example of how to arrange the prepreg tapes of the prepreg sheet in accordance with an embodiment of the present invention.

Specifically, the prepreg tapes of the prepreg sheet can overlap each other, as illustrated in FIG. 4, such that adjacent prepreg tapes overlap each other at both lateral edge portions of a single surface of a certain prepreg tape. The prepreg sheet illustrated in FIG. 4 can be alternatively prepared by, for example, (i) superimposing, in such a positional relationship as illustrated in FIG. 4, (a) a group of covering material-attached prepreg tapes that are provided at intervals, on (b) a group of prepreg tapes that are provided at intervals and (ii) peeling off the covering material. Alternatively, the prepreg sheet illustrated in FIG. 4 can be prepared by providing a group of prepreg tapes at intervals immediately above a group of prepreg tapes that are provided with a gap therebetween, or can be prepared by causing prepreg pieces, obtained by cutting out a prepreg with use of a cutting plotter, to be shifted with and overlap each other.

In addition, the prepreg sheet can further include a covering material on both surfaces or either one of the both surfaces thereof. The prepreg sheet that includes the covering material is easily handled (e.g. carried). The covering material can be selected as appropriate in accordance with an intended fiber-reinforced composite material molded article.

A laminated sheet can be alternatively manufactured by laminating covering material-attached prepreg sheets that have respective prepreg sheets. In a case where the laminated sheet is manufactured by laminating the covering material-attached prepreg sheets, a covering material is preferably removed so that no covering material remains between the prepreg sheets. In a case where the covering material that is integrated with a prepreg sheet during molding can impart, for example, tenacity to the prepreg sheet, the covering material can be left and used. The covering material-attached prepreg sheet includes the covering material and the prepreg sheet that is provided on the covering material. The prepreg sheet is configured such that on the covering material, a plurality of prepreg tapes overlap each other for an overlapping length (described earlier) and are juxtaposed to each other. As the covering material, a covering material described earlier can be used as appropriate.

[1-3. Method for Manufacturing Preform]

Examples of a method for manufacturing a preform in accordance with an embodiment of the present invention include a method for manufacturing a preform by preforming prepreg sheet 10 (described earlier) or the laminated sheet 1 (described earlier). The laminated sheet 1 can be a laminate including not only the prepreg sheet described in [1. Prepreg sheet] (described earlier) but also an intermediate base material (described later).

The covering material-attached prepreg sheet can be used instead of the prepreg sheet 10. The covering material-attached prepreg sheet is preferably used as the prepreg sheet after the covering material is removed from the covering material-attached prepreg sheet. In a case where the covering material that is integrated with a prepreg sheet during molding can impart a characteristic (e.g. tenacity) to the prepreg sheet, the covering material can be left and used.

(Preform)

A preform is obtained by forming a reinforcing fiber base material into a shape close to the shape of a molded article that is obtained by subjecting heating and pressurization to the reinforcing fiber base material.

(Preforming)

Preforming will be described in a preforming step described in [1-4. Method for manufacturing fiber-reinforced composite material molded article] described later.

[1-4. Method for Manufacturing Fiber-Reinforced Composite Material Molded Article]

Examples of a method for manufacturing a fiber-reinforced composite material molded article in accordance with an embodiment of the present invention include a method for manufacturing a molded article of a fiber-reinforced composite material by molding the laminated sheet 1 (described earlier). The method for manufacturing the fiber-reinforced composite material molded article includes the preforming step and the molding step. In the method for manufacturing the fiber-reinforced composite material molded article, a thermosetting resin composition is used as a matrix resin composition.

Since the method for manufacturing the fiber-reinforced composite material molded article includes the preforming step and the molding step, it is possible to obtain a molded article having a desired stereoscopic shape. In addition, during preforming and molding of the laminated sheet 1, the prepreg tapes are independently moved and deformed. Thus, a wrinkle and reinforcing fiber meandering can less occur during preforming and molding of the laminated sheet 1. Furthermore, since the laminated sheet 1 (described earlier) is used, no substantial gap is formed between reinforcing fiber bundles in a planar direction of a fiber-reinforced composite material molded article to be manufactured. Thus, the method for manufacturing the fiber-reinforced composite material molded article makes it possible to manufacture the fiber-reinforced composite material molded article that has a desired stereoscopic shape and excels in strength and appearance.

The laminated sheet 1 can be used as a laminate obtained by further placing, on the laminated sheet 1, a prepreg whose shape is identical to the shape of the laminated sheet 1 or corresponds to part of the shape of the laminated sheet 1, provided that the effect of the present invention is brought about.

(Preforming Step)

The preforming step is a step of preparing a preform by preforming, into a shape closer to the shape of the fiber-reinforced composite material molded article, a prepreg sheet 10, the laminated sheet 1 in which two or more prepreg sheets 10 are laminated, or a laminate in which one or more prepreg sheets 10 are used. A preform to be obtained can have a shape that is identical to or close (similar) to the shape of the fiber-reinforced composite material molded article. The shape that is close to the shape of the fiber-reinforced composite material molded article is, for example, a shape that is so similar to the shape of the fiber-reinforced composite material molded article as to allow the preform to be contained in a mold that is used in the molding step (described later).

In the preforming step, in order to manufacture the fiber-reinforced composite material molded article that has a precise shape, it is preferable to prepare a preform that has a shape that is almost substantially identical to the desired shape (stereoscopic shape) of a molded article, and it is more preferable to manufacture a preform that has a shape that is substantially identical to the shape (stereoscopic shape) of a molded article. In a case where the laminated sheet 1 is thus preformed before the molding step of obtaining an intended fiber-reinforced composite material molded article, it is possible to manufacture, with high quality and high efficiency, a fiber-reinforced composite material molded article that has a desired shape.

In preparing a preform of a stack of two or more laminated sheets 1, the preforming step can be a first step of preparing a plurality of preforms of a single laminated sheet 1, or can be a second step of preforming a plurality of stacks of laminated sheets 1 for each of the plurality of stacks of laminated sheets 1. In preparing a preform of a stack of two or more laminated sheets 1, the first step makes preforming easier than the second step. The second step is higher in operation efficiency than the first step.

Examples of the preforming step (preforming of the laminated sheet 1) include the following three methods:

(i) a method in which the laminated sheet 1 (described earlier) is manually stuck into the mold, so that a preform is manufactured by preforming the laminated sheet 1;

(ii) a method in which the laminated sheet 1 is provided on the mold, a rubber film or the like is provided on top of the laminated sheet 1, and then the rubber film is pressure-bonded to the laminated sheet 1 by vacuuming the inside of the mold, so that a preform is manufactured by preforming the laminated sheet 1; and (iii) a method in which male and female molds (the upper mold and the lower mold) are provided in a simple molding machine, the laminated sheet 1 is provided between the male and female molds that are open, and the laminated sheet 1 is preformed by compressing the male and female molds, so that a preform is manufactured.

The preforming step can be any one of the above three methods, or can be a method obtained by combining, as appropriate, two or more of the above three methods. The preforming step is preferably the method (iii). This is because the method (iii) makes it possible to preform the laminated sheet 1 in a short time even in a case where the laminated sheet has a large shape. The male and female molds herein mean a pair of molds (the upper mold and the lower mold) in which a protrusion or a recess of one of the molds corresponds to a recess or a protrusion of the other one of the molds.

The number of laminated sheets 1 to be subjected to the preforming step can be selected as appropriate in accordance with a demanded thickness of a molded article. For example, in a case where the molded article is required to have a thickness of a stack of five or more laminated sheets 1, a plurality of preforms are preferably prepared by carrying out, a plurality of times, a step of preforming a single laminated sheet 1 or preforming a stack of one or two to four laminated sheets 1. In a case where one or two to four laminated sheets 1 are to be preformed in the preforming step carried out once, it is possible to more suitably preform the laminated sheet(s) 1.

Figure 3:
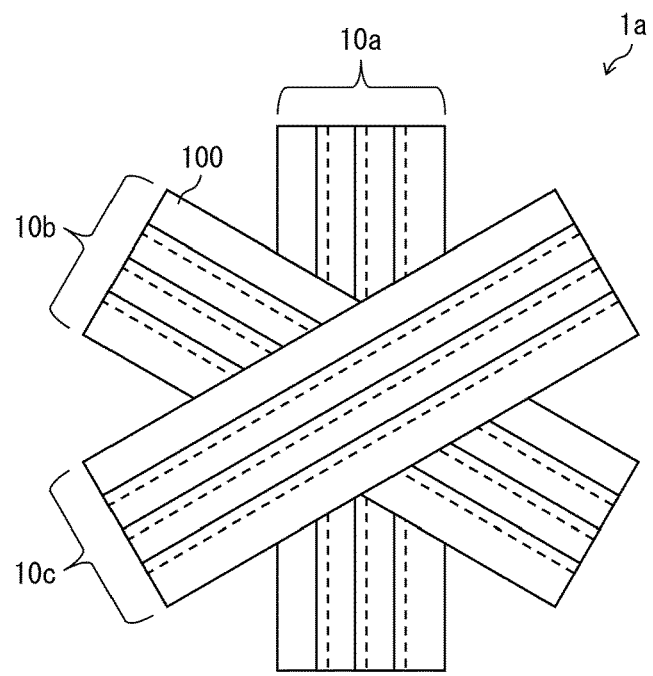
FIG. 3 is a view schematically illustrating another example of the configuration of the laminated sheet of an embodiment of the present invention.

In addition, in the preforming step, a first prepreg sheet and a second prepreg sheet that are laminated can be preformed so that orientation directions of prepreg tapes are different from each other when viewed in the lamination direction of the laminated sheets 1. In a case where prepreg sheets are laminated, prepreg tapes of each of the prepreg sheets do not need to intersect at an angle of 90° when viewed from above. For example, the prepreg sheets can be laminated as illustrated in FIG. 3. FIG. 3 is a view schematically illustrating another example of the configuration of the laminated sheet in accordance with an embodiment of the present invention. A laminated sheet 1a is constituted by three prepreg sheets 10 as illustrated in FIG. 3. Orientation directions of the prepreg tapes 100 of each of the prepreg sheets 10 intersect at an angle of 120°.

Alternatively, orientation directions of the prepreg tapes constituting each of the prepreg sheets do not need to intersect when the prepreg tapes are viewed from above.

Note that such a lamination structure as illustrated in FIG. 3 may be referred to as a pseudo-isotropic lamination. The pseudo-isotropic lamination means that n (n≥3) anisotropic material layers are laminated by being shifted by (360/n)°. In contrast, such a lamination structure as illustrated in FIG. 1 and in which the prepreg tapes are oriented so as to intersect at right angles (−90° or 90°) is, in particular, referred to as an orthogonal lamination.

Specifically, a first laminated sheet 1 and a second laminated sheet 1 can be preformed by being laminated, for example, so that the prepreg tapes 100 of the first laminated sheet 1 are orientated at 45° or 135° relative to the prepreg tapes 100 of the second laminated sheet. It is possible to form a pseudo-isotropic lamination such as 0°/90°/45°/−45° by thus laminating the laminated sheets 1. Therefore, in a case where the laminated sheets 1 are thus laminated, it is possible to design the fiber-reinforced composite material molded article that is highly isotropic, or the fiber-reinforced composite material molded article that has a high strength in any direction.

(Molding Step)

The molding step is a step of curing the preform by subjecting the preform to heating and pressurization in a mold whose temperature is adjusted to a temperature higher than or equal to a curing temperature of the thermosetting resin composition. This makes it possible to obtain the molded article of the fiber-reinforced composite material which molded article has a desired stereoscopic shape and a good appearance.

In the molding step, it is preferable that a plurality of preforms be laminated and subjected to heating and pressurization in a mold so as to be cured. For example, in a case where the molded article is required to have a thickness of a stack of five or more laminated sheets 1, it is preferable to use (i) a stack of a plurality of preforms each obtained by preforming a single laminated sheet 1 or (ii) a stack of a plurality of preforms each obtained by preforming a stack of two to four laminated sheets 1. This makes it possible to obtain the fiber-reinforced composite material molded article that has a desired thickness and a desired stereoscopic shape.

In a case where a stack of a plurality of preforms is used, preforms that are laminated are preferably used so that orientation directions of prepreg tapes are different from each other when the preforms are viewed from above. This makes it possible to design the fiber-reinforced composite material molded article that is highly isotropic, or the fiber-reinforced composite material molded article that has a high strength in any direction.

In the molding step, the temperature of the mold is preferably adjusted in advance. Such a temperature adjustment is preferable in order to shorten a molding cycle while avoiding a rise and a fall in temperature of the mold. As a result, it is possible to obtain the molded article with higher efficiency.

The mold that is used in the molding step can be selected as appropriate among known molds provided that the preform can be cured in the mold under a high temperature and a high pressure. It is preferable that a clearance (gap) in accordance with the thickness of the preform be set in the mold. In addition, the mold can further include a vacuuming mechanism or an ejector mechanism as necessary. In a case where the mold further includes such a mechanism, the inside of the mold can be kept airtight when the mold is closed. Note here that the term "airtight" means that a thermosetting resin contained in a molding material is not substantially leaked from the mold in a case where the molding material is placed in the mold in an amount sufficiently enough to fill the mold and then is subjected to pressurization.

Examples of the mold whose inside is kept airtight include a mold including a shear edge structure or a rubber seal structure at a place where an upper mold and a lower mold (a male mold and a female mold) are brought into contact with each other when the mold is tightened. In addition, a mold in which any known structure is employed can be used provided that the inside of the mold is kept airtight.

The method for manufacturing the fiber-reinforced composite material molded article can further include other step(s) different from the preforming step (described earlier) and the molding step (described earlier), provided that the effect of the present embodiment can be obtained. Examples of the other step(s) include the debulking step, a preheating step, and a cutting step.

(Debulking Step)

In a case where a laminated sheet 1 that is not debulked is used to manufacture the fiber-reinforced composite material molded article, the debulking step of debulking the laminated sheet 1 is preferably carried out before the preforming step. The debulking step can be carried out as in the case of the debulking step that has been described in "Method for manufacturing prepreg sheet".

(Preheating Step)

The preheating step is a step of preheating the laminated sheet 1 before the preforming step. This causes a modest reduction in viscosity of a matrix resin composition such as a thermosetting resin, so that a preforming operation can be more easily carried out in the preforming step to be carried out after the preheating step. This makes it possible to more excellently manufacture the preform in the preforming step to be carried out after the preheating step.

In a case where the matrix resin composition is a thermosetting resin composition, the preheating step is carried out at a temperature at which the laminated sheet 1 is not cured. Assume, for example, that the thermosetting resin composition in which the thermosetting resin is an epoxy resin is used. In this case, though depending on a temperature at which the thermosetting resin composition starts to be cured, the laminated sheet 1 is preferably preheated so as to have a temperature of higher than or equal to 40° C. The laminated sheet 1 is preheated so as to have a temperature of more preferably higher than or equal to 50° C., still more preferably higher than or equal to 60° C., and particularly preferably higher than or equal to 70° C. The laminated sheet 1 is preferably preheated so as to have a temperature of lower than or equal to 100° C. The laminated sheet 1 is preheated so as to have a temperature of more preferably lower than or equal to 90, and still more preferably lower than or equal to 80° C. A preheating temperature that is set to a temperature higher than or equal to the above lower limit tends to make it possible to impart sufficient moldability to a thermosetting resin in a case where, for example, an epoxy resin is used as the thermosetting resin. In addition, the preheating temperature that is set to a temperature lower than or equal to the above upper limit tends to make it possible to maintain viscosity of the thermosetting resin at a moderate level, and to, without causing any disorder of fibers of the preform in the preforming step to be carried out after the preheating step, finally obtain the fiber-reinforced composite material molded article that is excellent in mechanical property. A preheating time is preferably not less than 5 seconds, more preferably not less than 10 seconds, and still more preferably not less than 20 seconds. The preheating time is preferably not more than 120 seconds, more preferably not more than 90 seconds, and particularly preferably not more than 60 seconds.

Examples of the preheating step include a method of applying hot air to the laminated sheet 1, a method of irradiating the laminated sheet 1 with an infrared ray, and a method of providing the laminated sheet 1 on a heated plate. The laminated sheet 1 is preferably preheated by infrared-ray irradiation because the infrared-ray irradiation (i) allows the laminated sheet 1 to be preheated in a short time and (ii) makes it easy to handle the prepreg sheet that has been preheated.

(Cutting Step)

The cutting step of cutting the laminated sheet 1 or the preform into a desired shape can be carried out before the preforming step or before the molding step. In a case where the cutting step is carried out, it is possible to allow the shape (in particular, dimensions) of the preform to be the shape (dimensions) substantially identical to a desired shape of the molded article.

In the cutting step to manufacture the preform whose shape is substantially identical to the shape (dimensions) of the molded article, it is possible to, for example, cut the laminated sheet 1 into a planar developed shape, which is a desired shape for the molded article. By preforming the laminated sheet 1 thus cut, it is also possible to manufacture the preform whose shape is identical to the shape (dimensions) of the molded article.

Alternatively, after the preform whose shape is almost substantially identical to the shape (dimensions) of the molded article is manufactured by preforming the laminated sheet 1, an excess part of the preform can be cut. By thus carrying out the cutting, it is also possible to manufacture the preform whose shape is substantially identical to the shape (dimensions) of the molded article.

The cutting step is preferably carried out after the preforming step and before the molding step because the cutting step allows a preform to be obtained to have higher dimensional accuracy. In order to manufacture the preform whose shape is substantially identical to the shape (dimensions) of the molded article, it is preferable to cut the preform whose shape is almost substantially identical to the shape (dimensions) of the molded article.

Figure 5:
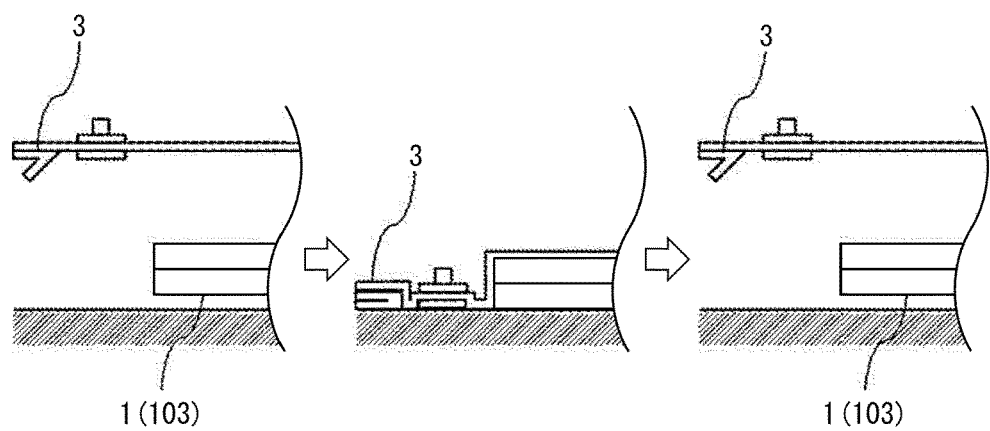
FIG. 5 is a view describing a debulking step of a method for manufacturing a fiber-reinforced composite material molded article in accordance with an embodiment of the present invention.
Figure 6:
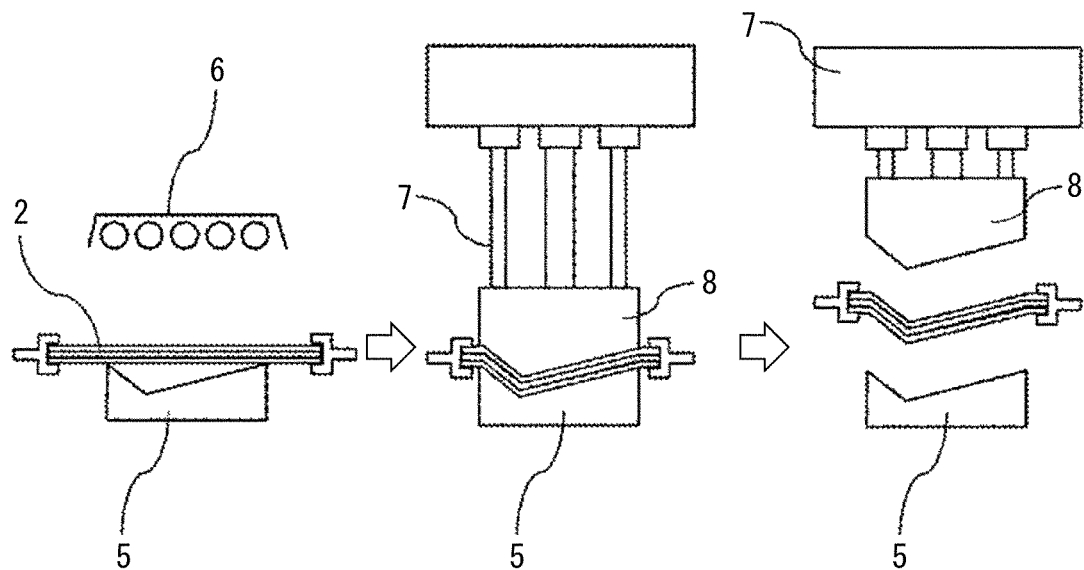
FIG. 6 is a view illustrating a preforming step of the method for manufacturing the fiber-reinforced composite material molded article in accordance with an embodiment of the present invention.
Figure 7:
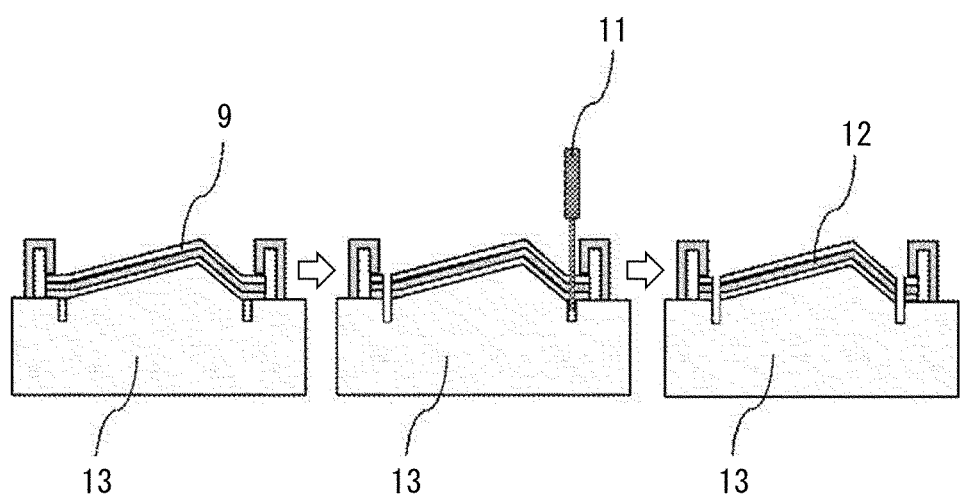
FIG. 7 is a view describing a cutting step of the method for manufacturing the fiber-reinforced composite material molded article in accordance with an embodiment of the present invention.

The following description will more specifically discuss, with reference to FIGS. 5 to 7, the method for manufacturing the fiber-reinforced composite material molded article of the present embodiment. In the following description, a stack of two laminated sheets 1 is used. A laminated sheet 1 includes two layers of prepreg sheets 10. The prepreg sheets 10 are laminated so that orientation directions of the prepreg tapes 100 of each of the prepreg sheets 10 are orthogonal to each other at 0°/90° when the prepreg sheets 10 are viewed from above.

(Debulking Step)

FIG. 5 is a view describing the debulking step of the method for manufacturing the fiber-reinforced composite material molded article in accordance with the present embodiment. First, the laminated sheet 1 is debulked. The laminated sheet 1 is carried onto a flat workbench as illustrated in FIG. 5. Next, the laminated sheet 1 is covered with a debulking device 3 (for example, a T-7 seal system manufactured by TORR SCIENCE CO., Ltd.). Subsequently, the laminated sheet 1 is debulked by using a vacuum pump to cause the inside of the debulking device 3 to be in a state of reduced pressure. The state of reduced pressure is formed by, for example, setting a vacuum pressure to 700 mmHg and maintaining the vacuum pressure for 5 minutes. Then, an internal pressure of the debulking device 3 is returned to an atmospheric pressure, so that the laminated sheet 1 that has been debulked is obtained.

(Preforming Step)

FIG. 6 is a view describing the preforming step of the method for manufacturing the fiber-reinforced composite material molded article in accordance with the present embodiment. First, four laminated sheets 1 each of which has been debulked are laminated by, for example, rotating the orientation direction of the prepreg tapes 100 of the laminated sheets 1 by 45°. Thus, a laminate 2 obtained by pseudo-isotropically laminating the laminated sheets 1 at 0°/45°/90°/−45° is prepared. Next, as illustrated in FIG. 6, the laminate 2 is placed on an opening of a female mold 5 that has a cavity having an open upper surface. Subsequently, the laminate 2 is heated to 70° C. by a movable infrared heater 6. Then, a male mold 8 attached to a simple molding machine 7 is lowered, and the laminate 2 is sandwiched between the female mold 5 and the male mold 8, so that the laminate 2 is preformed at 0.05 MPa to 1.0 MPa. Thus, a preform 9 whose shape is almost substantially identical to the shape (stereoscopic shape) of the molded article is manufactured. Thereafter, the female mold 5 and the male mold 8 are cooled by blowing air thereto, and the male mold 8 is lifted, and so that the preform 9 is taken out from the cavity of the female mold 5.

(Cutting Step)

FIG. 7 is a view describing the cutting step of the method for manufacturing the fiber-reinforced composite material molded article in accordance with the present embodiment. First, the preform 9 is placed on a trimming jig 13 illustrated in FIG. 7. Next, an outer circumference of the preform 9 is fixed. Then, the preform 9 is cut along a groove of the trimming jig 13 with use of an ultrasonic cutter 11. Thus, a preform 12 whose shape is substantially identical to the shape (dimensions) of the molded article is manufactured.

(Molding Step)

The following description will discuss an example of the molding step to be carried out after the cutting step. First, the preform 12 is provided in the lower mold of the mold whose temperature is adjusted to 140° C. in advance. Next, the mold is closed by bringing the upper mold of the mold whose temperature is adjusted to 140° C. in proximity to the lower mold, so that the preform 12 is subjected to pressurization. The mold has a contact pressure of preferably 1 MPa to 15 MPa, and more preferably 4 MPa to 10 MPa during the molding. The preform 12 is thus cured by being subjected to heating and pressurization with use of the mold. A molding time is preferably 1 minute to 15 minutes, and more preferably 2 minutes to 5 minutes. This results in obtainment of the molded article that has a desired shape. The molding time can be determined as appropriate in accordance with (i) productivity that the molded article is required to have and (ii) selection of a material for achieving the productivity. For example, in a case where a thermosetting resin for an automobile product (described earlier) is selected as appropriate, the molded article can be obtained by the heating and pressurization (described earlier) for 150 seconds to 600 seconds.

[1-5. Fiber-Reinforced Composite Material Molded Article]

The fiber-reinforced composite material molded article is obtained by using the laminated sheet 1 (described earlier) for the method (described earlier) for manufacturing the fiber-reinforced composite material molded article.

In the fiber-reinforced composite material molded article, a wrinkle and reinforcing fiber meandering are less likely to occur during the molding. This is because the laminated sheet 1 is subjected to heating and pressurization and cured. A high-straightness reinforcing fiber allows the molded article to have a high strength. This allows the molded article that has no wrinkle and in which reinforcing fiber meandering less occurs to have a high strength. In addition, no striped pattern is produced due to a reinforcing fiber bundle after the molding. Thus, the method for manufacturing the fiber-reinforced composite material molded article makes it possible to manufacture the fiber-reinforced composite material molded article that has a good appearance (excels in appearance).

Furthermore, according to the fiber-reinforced composite material molded article, the laminated sheet 1 is subjected to heating and pressurization and cured. Thus, the laminated sheet 1 and the prepreg sheet constituting the laminated sheet 1 can have high fast curing characteristics as described earlier. Such a fiber-reinforced composite material molded article can be manufactured with high productivity, and has a satisfactory appearance and a sufficient strength as described earlier. Thus, the fiber-reinforced composite material molded article is advantageously used for an automobile member. The automobile member for which the fiber-reinforced composite material molded article is to be used is an interior member that faces a car interior or for partitioning the car interior, or a structural member such as an automobile frame component or a drivetrain component.

According to the method for manufacturing the fiber-reinforced composite material molded article, the fiber-reinforced composite material molded article can be manufactured with use of a prepreg sheet 10 instead of the laminated sheet 1.

[2-1. Method for Manufacturing Preform]

Another example of the method for manufacturing a preform in accordance with the present embodiment includes a first step and a second step described below. The following description will discuss the first step and the second step in detail.

<First Step>

The first step is a step of manufacturing a primary premolded article by preforming an intermediate base material with use of a preform mold. In a case where a pair of molds are used or a plurality of molds into which a pair of molds is separately divided are used as preform molds described later, it is possible to preform an intermediate base material by fitting such a pair of molds with each other.

A primary premolded article is obtained by preforming an intermediate base material. Although depending on the preform mold, the intermediate base material is preferably preformed by fitting molds with each other because, in such a manner, a preform having a desired shape can be obtained efficiently. Preforming means to form an intermediate base material such that the intermediate base material has a shape close to the shape of a molded article to be manufactured by heating and pressurization of a preform. In addition, the term "fitting mold with each other" means fitting a pair of molds (upper mold and lower mold) described later with each other. By fitting the molds with each other, an intermediate base material or the like provided in the lower mold of the pair is compressed so as to be preformed to have a shape corresponding to that of the lower mold.

A preform mold is a mold for preparing a preform. In general, a preform has a pair of molds. Each pair of molds may or may not be separately divided into a plurality of molds, provided that a desired shape can be obtained. The pair of molds means a pair of molds in which a protrusion or a recess of one of the molds corresponds to a recess or a protrusion of the other one of the molds. The shape of the pair of molds can be set as appropriate in accordance with the shape of a premolded article to be manufactured. Note that the term "premolded article" herein can be a preform, and collectively refers to a primary premolded article and a secondary premolded article described later. That is, the term "premolded article" herein refers to one or both of the primary premolded article and the secondary premolded article.

An intermediate base material contains a reinforcing fiber base material and a matrix resin composition. The intermediate base material ordinarily has a sheet-like form and can have any form, provided that the form corresponds to the shape of a premolded article to be manufactured. The intermediate base material will be discussed later.

The number of intermediate base materials to be subjected to the first step can be selected as appropriate in accordance with a demanded thickness of a molded article. For example, the number of intermediate base materials to be preformed by fitting molds with each other in a single preforming step is higher than or equal to one, preferably 2 to 5, more preferably 2 to 4, and still more preferably 2 to 3. In a case where the number of intermediate base materials to be laminated is higher than or equal to the above-described lower limit, it is possible to efficiently obtain a preform with a small number of times of preforming when preforming is carried out a plurality of times to obtain the preform. In a case where the number of times of preforming is lower than or equal to the upper limit, it is possible to allow a wrinkle and reinforcing fiber meandering to occur less during molding.

Figure 8:
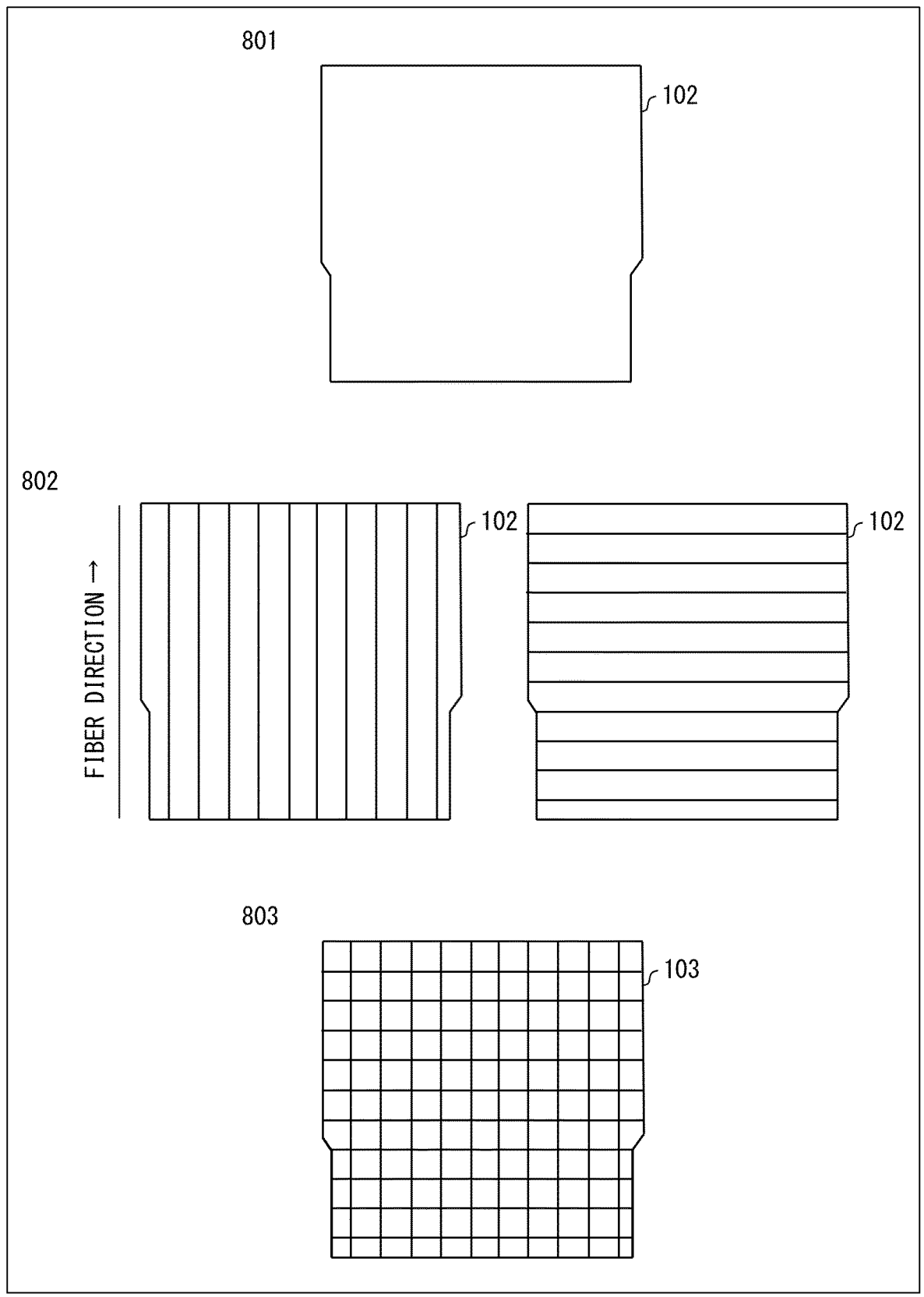
FIG. 8 is a view schematically illustrating an example of an intermediate base material that is used in a method for manufacturing a preform in accordance with an embodiment of the present invention. 801 illustrates an example of an intermediate base material 102 having a desired shape. 802 illustrates an example of a prepreg sheet (intermediate base material 102) in which fibers are oriented at 0° (on the left side of 802) at 90° (on the right side of 802). 803 shows an example of a laminate 103 obtained by laminating two prepreg sheets illustrated in 802.

In a case where the reinforcing fibers contained in the intermediate base materials are continuous filaments in the first step, the intermediate base materials can be laminated so as to a laminate and then preformed so that orientation directions of the reinforcing fibers contained in the intermediate base materials are different from each other when viewed in a direction in which the intermediate base materials are laminated to each other. The intermediate base materials that are laminated to each other do not need to intersect each other at 90° when viewed from above. In addition, the orientation directions do not need to intersect when the intermediate base materials constituting the primary premolded article are viewed from above. 802 in FIG. 8 illustrates an example of a prepreg sheet (intermediate base material 102) in which fibers are oriented in a direction of 0° (on the left side) or in a direction of 90° (on the right side).

In addition, the intermediate base materials can be laminated in the form of pseudo-isotropic lamination. The pseudo-isotropic lamination means that in a case where anisotropic materials, particularly reinforcing fibers contained in an intermediate base material, are continuous filaments and are oriented unidirectionally, n (n≥3) layers are laminated to each other by rotating the orientation direction of the reinforcing fibers by (360/n)°. In addition, the intermediate base materials can be laminated in the form of orthogonal lamination. The orthogonal lamination means a lamination structure in which, in a case where anisotropic materials, particularly reinforcing fibers contained in an intermediate base material, are continuous filaments and are oriented unidirectionally, a plurality of intermediate base materials are laminated so that the reinforcing fibers are oriented so as to intersect at right angles (−90° or 90°).

Specifically, for example, a first intermediate base material and a second intermediate base material that are laminated to each other can be preformed so that the reinforcing fibers contained in the intermediate base materials are oriented at 45° or 135°. It is possible to form, for example, a pseudo-isotropic lamination such as [0°/45°/90°/−45°/0°] by thus laminating the intermediate base materials. In a case where the intermediate base materials are thus laminated, it is possible to design the fiber-reinforced composite material molded article that is highly isotropic, or the fiber-reinforced composite material molded article that has a high strength in any direction.

The first step can be carried out by a known method in which a prepreg sheet is preformed (i.e., a preform is manufactured). The first step can be carried out with use of, for example, the simple molding machine 7 illustrated in FIG. 6. The first step will be described below with reference to FIG. 6.

As illustrated on the left side of FIG. 6, one or more laminates 2, such as an intermediate base material 102 or a laminate 103, are placed on an opening of a lower mold 5 of an open upper surface. Subsequently, the intermediate base material 102 is heated by the movable infrared heater 6. A heating temperature of the heater is preferably higher than or equal to 50° C., more preferably higher than or equal to 60° C., and still more preferably higher than or equal to 70° C. The heating temperature of the heater is preferably lower than or equal to 100° C., more preferably lower than or equal to 90° C., and still more preferably lower than or equal to 80° C. A heating time of the heating by the heater is preferably not less than 5 seconds, more preferably not less than 10 seconds, and particularly preferably not less than 20 seconds. The heating time of the heating by the heater is preferably not more than 120 seconds, more preferably not more than 90 seconds, and particularly preferably not more than 60 seconds.

Next, an upper mold 8 attached to the preform mold is lowered, and the one or more intermediate base materials 102 are sandwiched between the lower mold 5 and the upper mold 8. The one or more intermediate base materials 102 are preformed by fitting the molds with each other at a contact pressure of preferably 0.05 MPa to 1.0 MPa, more preferably 0.1 MPa to 0.8 MPa, and still more preferably 0.3 MPa to 0.5 MPa. This generates a primary premolded article. After preforming, the lower mold 5 and the upper mold 8 are cooled by, for example, blowing air thereto, and the upper mold 8 is lifted.

<Second Step>

The second step is a step of manufacturing a secondary premolded article by placing one or more intermediate base materials on the primary premolded article, which is placed in the preform mold, and preforming the primary premolded article and the one or more intermediate base materials. In a case where a pair of molds are used or a plurality of molds into which a pair of molds is separately divided are used as preform molds, it is possible to preform the one or more intermediate base materials by fitting such a pair of molds with each other. Although depending on the preform mold, the one or more intermediate base materials are preferably preformed by fitting molds with each other because, in such a manner, a preform having a desired shape can be obtained efficiently.

The one or more intermediate base materials used in the second step are not those preformed in the first step, but are those which have not been preformed.

The state in which the primary premolded article is placed in the preform mold is a state in which the primary premolded article is contained in the lower mold. Such a state can be achieved by, for example, removing the primary premolded article from the preform mold and then placing the primary premolded article in the preform mold again. After the first step is complete, however, the primary premolded article is preferably not removed from (not taken out of) the preform mold. This is for making the manufacturing operation efficient and for preventing the occurrence of a deterioration in the appearance, such as the case of a wrinkle in the preform, which results from displacement occurring due to placing the primary premolded article again.

A secondary premolded article is manufactured by further preforming: a primary premolded article obtained by preforming an intermediate base material; and an intermediate base material placed on the primary premolded article. More specifically, examples of a secondary premolded article include (i) an article obtained by further preforming a primary premolded article and an intermediate base material placed on the primary premolded article and (ii) an article obtained by further preforming a secondary premolded article and an intermediate base material placed on the secondary premolded article.

A position, at which the one or more intermediate base materials are placed on the primary premolded article, can be determined as appropriate, provided that a desired preform can be manufactured. In general, for allowing a trimming step after a preform is obtained to be easy, an intermediate base material is placed so that end portions of the intermediate base material match those of the primary premolded article as much as possible. In addition, fitting of the molds with each other in the second step can be carried out under conditions identical or different to/from the conditions of the first step.

As in the case of the first step, the second step can also be carried out by a known method in which a prepreg sheet is preformed to manufacture a preform. For example, as in the case of the first step, the second step can be carried out with use of the simple molding machine 7 illustrated in FIG. 4. In addition, by the procedure similar to that in the first step, the primary premolded article and the intermediate base materials placed on the primary premolded article can be preformed by fitting the molds with each other.

The number of intermediate base materials to be laminated on the primary premolded article in the second step is higher than or equal to one, preferably 2 to 5, more preferably 2 to 4, and still more preferably 2 to 3. In a case where the number of intermediate base materials to be laminated falls within the ranges above, it is possible to allow a wrinkle and reinforcing fiber meandering to occur less during molding.

When the intermediate base materials are placed on the primary premolded article in the second step, a material that imparts slidability is preferably not placed between the primary premolded article and the intermediate base materials. This also applies to a third step described later. If there is a material that imparts slidability, the end portions of a preform to be ultimately obtained will shift, so as to necessitate a trimming step. It is therefore preferable not to place the material that imparts slidability. Examples of the material include materials in the forms of a nonwoven fabric, a powder, and a film. Examples of the materials such as the nonwoven fabric, the powder, and the film include thermoplastic resins, particularly nylon and polyester.

In the present embodiment, the preform is, among secondary premolded articles, a secondary premolded article in which the lamination and the preforming have been completed and which is immediately before being cured by heating and pressurization. The preform has a thickness of, for example, 1.0 mm to 4.0 mm, and the thickness can be determined as appropriate in accordance with a molded article to be manufactured. The thickness of the preform can be measured by any known method. The thickness of the preform can be represented by, for example, an average value of thicknesses at a plurality of positions of one or more preforms, which positions are randomly selected. In a case where the thicknesses of only a portion are increased as a result of, for example, partially increasing the number of laminated intermediate base materials, the average value of the thicknesses at a plurality of randomly selected positions of one or more preforms is used to represent each of (i) the portion having the increased thicknesses and (ii) remaining portions. In the present embodiment, in order to control the thickness of the preform to be finally obtained, the step of placing the intermediate base materials on the article and preforming the intermediate base materials can be further repeated. For example, the method for manufacturing the preform in accordance with the present embodiment can further include the third step described below. The third step will be described in detail below.

<Third Step>

The third step is a step of manufacturing, one or more times, a secondary premolded article by placing one or more intermediate base materials on the secondary premolded article which is placed in the preform mold, and the secondary premolded article and the one or more intermediate base materials are preformed. The third step makes it possible to manufacture a secondary premolded article having a larger thickness and a greater weight. In a case where a pair of molds are used or a plurality of molds into which a pair of molds is separately divided are used as preform molds, it is possible to preform the one or more intermediate base materials by fitting such a pair of molds with each other. Although depending on the preform mold, the one or more intermediate base materials are preferably preformed by fitting molds with each other because, in such a manner, a preform having a desired shape can be obtained efficiently.

The one or more intermediate base materials used in the third step are not those preformed in the first step and the second step, but are those which have not been preformed.

In the third step, the procedure similar to those in the first step and the second step can be used to carry out the preforming. For example, the secondary premolded article and the intermediate base materials placed on the secondary premolded article can be preformed by fitting the molds with each other. As in the cases of the first step and the second step, the third step can be carried out with use of the simple molding machine 7 illustrated in FIG. 6.

The number of intermediate base materials to be laminated on the secondary premolded article in the third step is higher than or equal to one, preferably 2 to 5, more preferably 2 to 4, and still more preferably 2 to 3. In a case where the number of intermediate base materials to be laminated falls within the ranges above, it is possible to allow a wrinkle and reinforcing fiber meandering to occur less during molding. In comparison with manufacturing a preform by preforming a plurality of intermediate base materials through fitting molds with each other once, carrying out the third step a plurality of times makes it possible to manufacture a preform in which wrinkles, fiber meandering, and fiber twisting occur less. In addition, stacking a plurality of primary premolded articles and then fitting the molds with each other makes it difficult to stack, without gaps, the primary premolded articles having an identical shape. This makes it likely for wrinkles and fiber meandering to occur. In contrast, manufacturing a preform by carrying out the preforming through repeating the third step makes it possible to manufacture a preform in which wrinkles, fiber meandering, and fiber twisting are unlikely to occur. In manufacturing a preform having a three-dimensional shape, in particular, it is possible to obtain a preform in which no wrinkles and fiber meandering occur and which has an excellent appearance and excellent strength. In addition, the third step can be repeated also in a case where the three-dimensional shape involves shear deformations and compressive deformations. Furthermore, even without cutting reinforcing fibers contained in the reinforcing fiber base material, it is still possible to obtain a preform in which no wrinkles and fiber meandering occur and which has an excellent appearance and excellent strength.

The number of times of the third step is carried out is preferably 10 times or less, more preferably 8 times or less, and still more preferably 2 times to 5 times. In a case where the number of times of the third step falls within the above ranges, it is possible to obtain a fiber-reinforced composite material molded article having an excellent appearance and excellent strength. It is also possible to obtain a three-dimensional molded article having an excellent appearance and excellent strength even if the thickness is large.

According to the present embodiment, even a preform having a complex shape can be manufactured by repeating the stacking of intermediate base materials and preforming.

A preform mold which can be used for preforming for the complex shape is, for example, a preform mold having an elevation structure facing an inner space of the preform mold. Such a preform mold makes it possible to manufacture a preform having a complex three-dimensional shape, and is therefore preferable. There is no limitation on the number of the elevation structures in the preform mold. The three-dimensional shape and the elevation structure will be described below.

(Three-Dimensional Shape)

The three-dimensional shape refers not to a planar shape but to a stereoscopic shape, and is considered to include developable surfaces and/or a three-dimensional curved surface. The "developable surfaces" refers to surfaces that become a flat surface by being unfolded. The "three-dimensional curved surface" refers to a surface that cannot be a flat surface by being unfolded. In a case where a sheet member having the form of a two-dimensional flat surface is pressured so as to follow a mold for forming the three-dimensional shape, a shear deformation generally occurs at the preforming. In a case where, at the preforming, the original sheet member is pressured to follow a surface having an area which is small relative to that of the sheet member, a compressive deformation occurs.

The present embodiment makes it possible to obtain a preform that has a good appearance even in a case where a planar intermediate base material is preformed to the three-dimensional shape in which a shear deformation occurs. In addition, it is possible to obtain a preform that has a good appearance even in a case where not only the shear deformation but also a compressive deformation occurs.

(Elevation Structure)

The elevation structure refers to a structure that may be included in the three-dimensional shape, and is a structure including, in the recess described earlier, (i) a first surface of a preform mold and (ii) a second surface that stands from the first surface at an angle of 90° to 170° with respect to the first surface.

The first surface and the second surface are ordinarily flat surfaces, but can be curved surfaces. The first surface is, for example, a surface that intersects a horizontal plane at an angle of 0° to 30°. The second surface is, for example, a surface that intersects a vertical plane at an angle of 0° to 80°.

For example, in a case where the first surface is a flat surface in the elevation structure, the second surface of an elevation structure makes an angle of preferably 100° to 170° inclusive, more preferably 110° to 170° inclusive, and still more preferably 120° to 170° inclusive, with respect to the first surface.

For allowing wrinkles to occur less in a preform having the complex shape, the method for manufacturing the preform in accordance with the present embodiment can include a fourth step described below. The fourth step will be described in detail below.

<Fourth Step>

The fourth step is a step of partially fixing, relative to the primary premolded article or the secondary premolded article, the one or more intermediate base materials that are placed on the primary premolded article or the secondary premolded article. The intermediate base materials used in the fourth step are not those preformed in the first step, the second step, and the third step, but are those which have not been preformed.

The part of an intermediate base material to be fixed can be fixed to the primary premolded article or to the secondary premolded article, or can be fixed to the preform mold. According to such fixing, an intermediate base material that is being preformed is deformed, based on the fixed part thereof, so as to follow respective inner surfaces of an upper mold and a lower mold. This causes the amount, by which the intermediate base material being preformed is shifted from the primary premolded article or the secondary premolded article, to be defined by the fixed part. Therefore, the fixing above is effective in allowing the wrinkles to occur less. Although depending on the shapes of molds, the preformability can be improved by the fixing above in a case where the deformation of the intermediate base material involves, in particular, shearing and/or compression. The part of the intermediate base material to be fixed will be described below.

(Part of Intermediate Base Material to be Fixed)

The fixed part described above is preferably a part of an edge portion of the intermediate base material, and more preferably a part of the end portion of the intermediate base material, at which part a shear deformation is unlikely to occur. The "part of the end portion at which a shear deformation is unlikely to occur" means a part whose lengths in a three-dimensional form and in a two dimensionally projected form are hardly different when viewed from a set direction. Specifically, the "part of an outer circumferential end portion at which a shear deformation is unlikely to occur" means an end portion having a shape which allows an intermediate base material to be unfolded so as to be a flat surface.

In view of drape properties of a prepreg, it is preferable to fix at least a part of the intermediate base material in a case where the prepreg after being cut is placed in the lower mold. In a case where at least part of a portion corresponding to the bottom part of the upper mold is to be fixed, the rigidity of a prepreg may cause an unfixed part to be detached from the mold and lifted up.

In contrast, a part at which shear deformation easily occurs is, for example, a part having a spherical shape or a part having a corner shape. In particular, in a case where a three-dimensional shape surrounded by three surfaces (described later) is prepared with use of a member having a planar shape that is not a developed shape, there is a possibility that not only a shear deformation but also a compressive deformation may progress simultaneously at a part including the three surfaces. For example, in a case of a part including three surfaces such that two surfaces intersect the other surface at an angle of greater than 90° and the two surfaces intersect each other at an angle of 90° or less, a shear deformation occurs because a difference in length occurs in a direction along a ridge of the surface that intersects the other surface at an angle of greater than 90°. In addition, a compressive deformation simultaneously occurs in the direction along the ridge. Examples of each of the three surfaces include (i) surfaces constituted only by flat surfaces, (ii) surfaces constituted only by curved surfaces, and (iii) surfaces constituted by flat surfaces and curved surfaces. Note that an angle at which surfaces intersect is an angle made between the surfaces at a ridge, and is the smallest angle among the angles made between sides facing a space surrounded by the three surfaces.

(Method for Fixing Part of Intermediate Base Material)

In the fourth step, the method for fixing a part of the intermediate base material can be selected as appropriate, provided that the intermediate base material placed on the primary premolded article or on the secondary premolded article is fixed relative to the premolded article. For example, the method for fixing the intermediate base material can be adhesion of the intermediate base material with use of an adhesive member (such as a heat-resistant tape). Such adhesion is preferable for fixing the intermediate base material without requiring any special devices.

For simpler fixing, the method for fixing the intermediate base material is preferably a method in which the intermediate base material is fixed by tackiness. By fixing a part of the intermediate base material with use of tackiness (adhesiveness) of the intermediate base material, it is possible to conveniently and easily fix the part relative to the primary premolded article or the secondary premolded article.

Examples of the fixing of the intermediate base material by tackiness include fixing by heating, fixing by pressurization, and fixing by vacuum degassing.

(Fixing by Heating)

Figure 9:
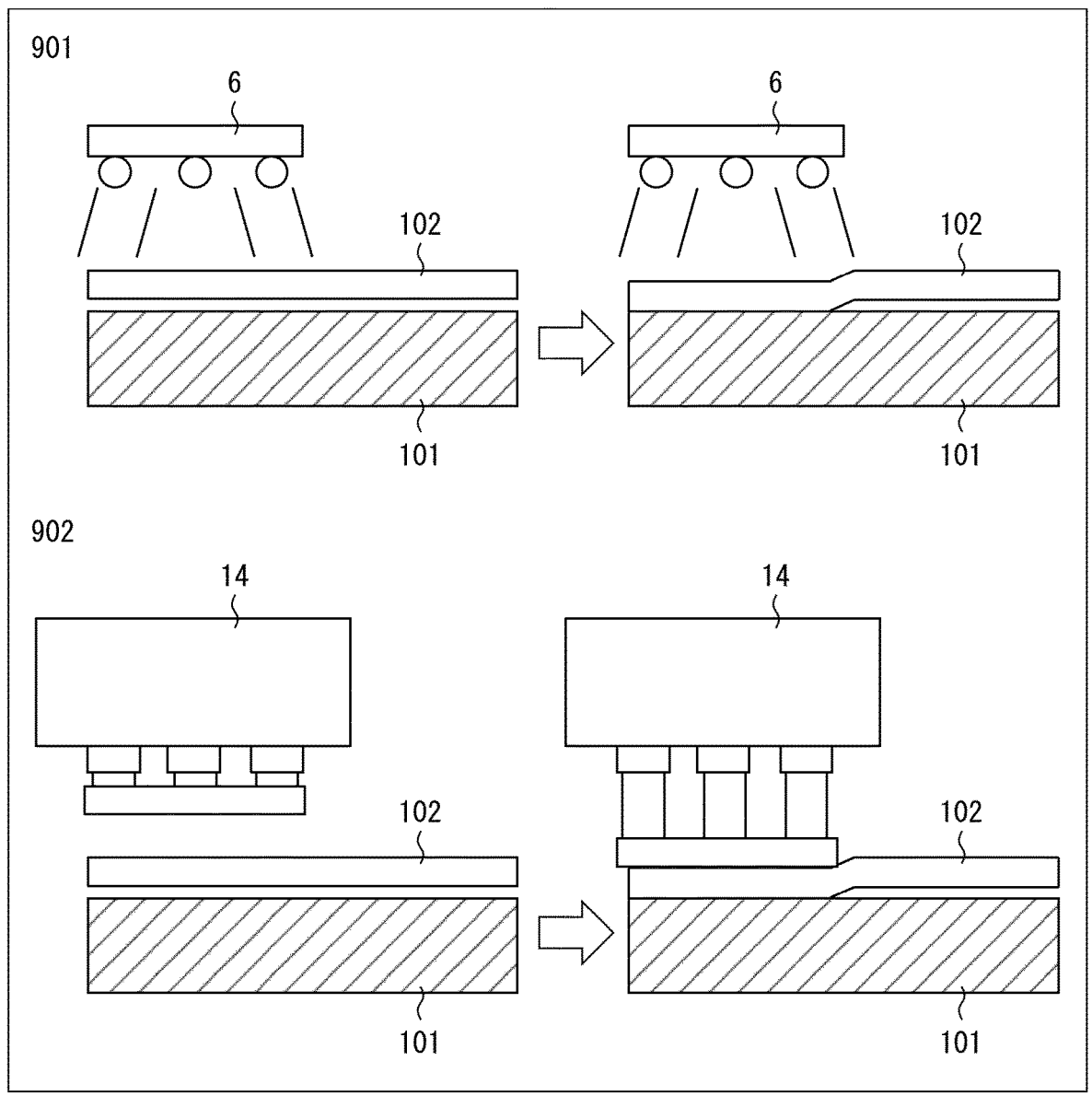
FIG. 9 is a view illustrating a fixing step of fixing an intermediate base material, a primary premolded article, or a secondary premolded article, the fixing step being included in the method for manufacturing the preform in accordance with an embodiment of the present invention. 901 illustrates an example of the fixing step carried out by heating. 902 illustrates an example of the fixing step carried out by pressurization.

Fixing by heating is, for example, a fixing method in which an intermediate base material and a premolded article are fixed to each other by partially heating the intermediate base material and/or the premolded article so that a matrix resin composition contained in the intermediate base material and/or the premolded article has less viscosity so as to effuse, which causes the adhesiveness to be stronger. The heating conditions for the fixing by heating can be set as appropriate, provided that the adhesion strength is obtained sufficiently by the adhesiveness. A heating temperature and a heating time can be set as appropriate by considering (i) the range of the viscosity of the matrix resin composition and (ii) a change in viscosity due to the temperature increase. 901 in FIG. 9 illustrates an example of the fixing by heating. The movable infrared heater 6 is used to heat the intermediate base material 102 and/or the primary (secondary) premolded article 101 so as to fix the intermediate base material and the premolded article to each other. It is also possible to carry out the fixing by, for example, hot air from a dryer.

(Fixing by Pressurization)

Fixing by pressurization is, for example, a method that allows an intermediate base material to be fixed to a premolded article by partially heating the intermediate base material so that a matrix resin composition contained in the intermediate base material effuses so as to cause the adhesiveness to be stronger. As in the case of the step carried out by heating, the conditions for the fixing by pressurization can also be determined as appropriate in view of adhesion strength to be obtained. 902 in FIG. 9 illustrates an example of the fixing by pressurization. The simple pressing machine 14 is used to fix the intermediate base material 102 to the primary (secondary) premolded article 101. As an alternative to pressurization with use of the simple pressing machine 14, it is possible to fix the intermediate base material 102 by, for example, (i) pressurization by placing a weight on the intermediate base material 102 or (ii) pressurization by using a hand.

(Fixing by Vacuum Degassing)

Fixing by vacuum degassing is, for example, a method in which an intermediate base material is fixed to a premolded article by covering the entire intermediate base material in such a manner as to make it airtight and then vacuum degassing the covered part so as to (i) cause a space between the primary premolded article and the preform mold to be airtight or (ii) cause a space between the primary premolded article and the secondary premolded article to be airtight. As in the case of the step carried out by heating or pressurization, the conditions for the fixing by vacuum degassing can also be determined as appropriate in view of adhesion strength to be obtained. For example, the debulking device 3 illustrated in FIG. 5 can be used to carry out the fixing by vacuum degassing.

Observation of the cross section of a preform shows that the number of clamping is greater at a lower layer, so that a space between preformed prepregs is smaller at a lower layer.

(Example of Preform)

Figure 11:
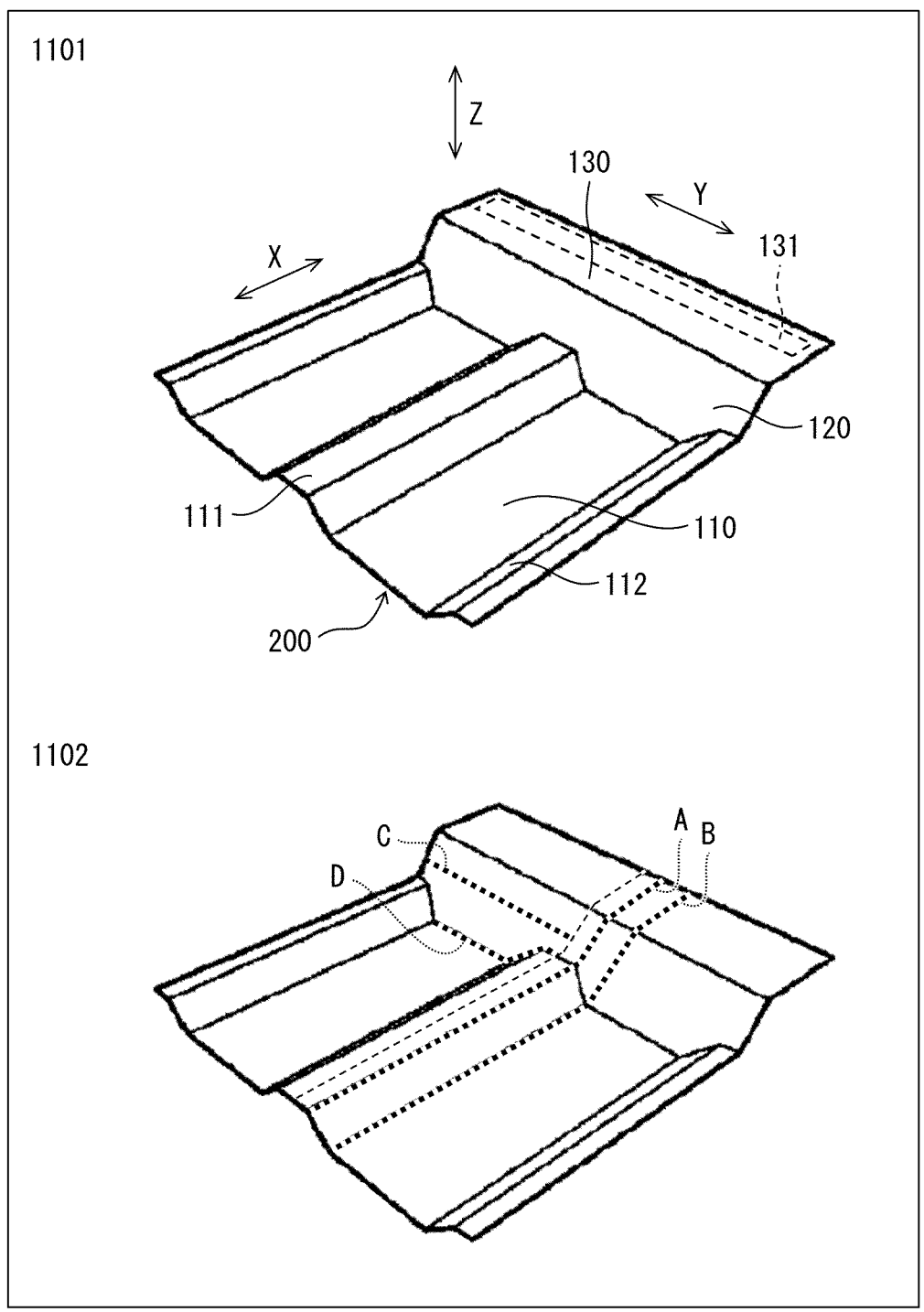
FIG. 11 is a view schematically illustrating an example of the preform in accordance with an embodiment of the present invention.

FIG. 11 is a view schematically illustrating an example of the preform that is manufactured in the present embodiment. The preform is, for example, a preform for a floor pan inside an automobile.

As illustrated in FIG. 11, a preform 200 has (i) a bottom surface part 110, (ii) an upright surface part 120 that stands from an end portion of the bottom surface part 110, and (iii) an upper surface part 130 that is connected to an end of the upright surface part. Note that a double-headed arrow X in FIG. 11 indicates a direction in which the bottom surface part 110, the upright surface part 120, and the upper surface part 130 are connected. A double-headed arrow Y in FIG. 11 indicates a direction that is orthogonal to the double-headed arrow X. A direction in which a double-headed arrow Z extends is orthogonal to both the double-headed arrow X and the double-headed arrow Y, and indicates a height direction of the preform 200.

The bottom surface part 110 has, in a Y-direction central portion thereof, a protruding part 111 that extends in an X direction. The shape of a cross section that is orthogonal to the X direction of the protruding part 111 is a trapezoid. The bottom surface part 110 has a protruding edge part 112 in a Y-direction end portion thereof. The shape of a cross section that is orthogonal to the X direction of the protruding edge part 112 is a right-angle trapezoid whose interior angles include two right angles.

The upright surface part 120 is a part having a surface that stands from an X-direction end edge of the bottom surface part 110.

The upper surface part 130 is a part that (i) extends from an X-direction end edge of the upright surface part 120 and (ii) is constituted by a surface that is parallel to the bottom surface part 110.

The protruding part 111 and the protruding edge part 112 are identical in height H1 from the bottom surface part 110. A height H2 of the upper surface part 130 from the bottom surface part 110 is greater than the height H1 and is approximately twice as great as H1.

The preform 200 is constituted by a plurality of layers of intermediate base materials. The preform 200 is formed by fitting molds with each other so as to sequentially preform the intermediate base materials, with use of a preform mold that has a space whose shape is identical to the shape of the preform illustrated in FIG. 11. Specifically, a primary premolded article is formed by preforming an intermediate base material with use of the preform mold, an upper mold of the preform mold is removed, and a secondary premolded article is formed by further placing an intermediate base material on the primary premolded article, which is contained in a lower mold of the preform mold. Then, preforming of the secondary premolded article on which an intermediate base material is placed is repeatedly carried out until a molded article to be obtained can have a required thickness, so that the molded article is manufactured.

In such repeated preforming, the intermediate base material that is placed on the primary premolded article or the secondary premolded article is partially fixed relative to the primary premolded article or the secondary premolded article. Thus, a part that is fixed when the intermediate base material is preformed in the repeated preforming can be an X-direction end edge part 131 of the upper surface part 130. The end edge part 131 is an end portion in a direction of shear deformation. Specifically, in the repeated preforming, the intermediate base material is fixed to the primary premolded article or the secondary premolded article in the end edge part 131 due to, for example, its tackiness, and then is preformed by fitting the molds with each other.

Due to the shape of the preform 200, a difference in length between a ridgeline A and a ridgeline B of 1102 of FIG. 11 causes shear deformation in the preform 200. In addition, a difference in length between a dotted line C and a dotted line D of 1102 of FIG. 11 causes compressive deformation in the upright surface part. In a case where shear deformation occurs, a wrinkle easily appears. However, since the intermediate base material is preformed by being fixed in the end edge part 131, a wrinkle is less likely to appear even in a part in which a wrinkle easily appears as described above. Thus, the preform that has such a complicated shape as illustrated in FIG. 11 can also be manufactured from the intermediate base material (prepreg sheet) by fitting the molds with each other.

<Other Steps>

The method for manufacturing the preform in accordance with the present embodiment can include other steps as appropriate. Examples of the other steps include a cutting step of cutting the intermediate base material into a desired shape and a debulking step of debulking the primary premolded article.

(Cutting Step)

The cutting step is a step of cutting the intermediate base material into a desired shape before the intermediate base material is placed on the primary premolded article or the secondary premolded article. In a case where the cutting step of cutting the intermediate base material into a desired shape is carried out, it is possible to allow the shape (in particular, dimensions) of the preform to be the shape (dimensions) identical to a desired shape of the molded article. Examples of the desired shape include the shape illustrated in 801 of FIG. 8.

The cutting step can be carried out, for example, automatically with use of a cutting device such as the ultrasonic cutter 11 illustrated in FIG. 7, or manually with use of the trimming jig 13 illustrated in FIG. 7, scissors, a cutter, or the like.

In order to manufacture the preform whose shape is identical to the shape (dimensions) of the molded article, in the cutting step, for example, the intermediate base material is cut into a shape that is close to a planar developed shape, which is a desired shape of the molded article. It can be determined as appropriate, from the viewpoint of an appearance and a strength each of which the molded article is required to have, to what degree to cut the intermediate base material. Note, however, that it is preferable, from the viewpoint of the strength, to (i) cut the intermediate base material into a shape that prevents, as much as possible, reinforcing fibers from being cut and (ii) deform the intermediate base material in the preforming step so as to cause the intermediate base material to conform to the mold. By preforming a plurality of intermediate base materials, which are cut as described above, by fitting the molds with each other, it is also possible to manufacture the preform whose shape is identical to the shape (dimensions) of the shape of the molded article.

Alternatively, after a preform 9 (12) whose shape is substantially identical to the shape (dimensions) of the molded article is manufactured by preforming the intermediate base material, an excess part of the preform 9 (12) can be cut. By thus carrying out the cutting, it is also possible to manufacture the preform whose shape is identical to the shape (dimensions) of the molded article.

(Debulking Step)

In a case where the debulking step of debulking one or more intermediate base materials or a laminate obtained by laminating the one or more intermediate base materials is carried out, it is possible to remove air contained in the one or more intermediate base materials. This allows the intermediate base materials to more securely adhere to each other.

One or more intermediate base materials or a laminate obtained by laminating the one or more intermediate base materials are preferably debulked by a method that prevents meandering of reinforcing fibers contained in the one or more intermediate base materials or in the laminate obtained by laminating the one or more intermediate base materials. Examples of such a debulking method include a method in which one or more intermediate base materials or a laminate obtained by laminating the one or more intermediate base materials are/is provided on a flat tool, an elastic sheet such as a rubber film is provided on top of the one or more intermediate base materials or the laminate obtained by laminating the one or more intermediate base materials, and then the rubber film is pressure-bonded, by carrying out vacuuming from the primary premolded article side, to the one or more intermediate base materials or the laminate obtained by laminating the one or more intermediate base materials. The debulking step (i) allows the intermediate base materials to more securely adhere to each other and (ii) makes it possible to substantially maintain a state of aggregation of the reinforcing fibers.

The debulking step can be carried out with use of, for example, the debulking device 3 illustrated in FIG. 5. The debulking step will be described below with reference to FIG. 5.

FIG. 5 is a view describing the debulking step of the method for manufacturing the preform in accordance with the present embodiment. The laminate 103 is carried onto a flat workbench. Next, the laminate 103 is covered with the debulking device 3 (for example, a T-7 seal system manufactured by TORR SCIENCE CO., Ltd.). Subsequently, the laminate 103 is debulked by using a vacuum pump to cause the inside of the debulking device 3 to be in a state of reduced pressure. The state of reduced pressure is formed by, for example, setting a vacuum pressure to 700 mmHg and maintaining the vacuum pressure for 5 minutes. Then, an internal pressure of the debulking device 3 is returned to an atmospheric pressure, so that the laminate 103 that has been debulked is obtained.

The method for manufacturing the preform in accordance with the present embodiment is preferably configured such that the method includes no slidability imparting step of imparting slidability to an intermediate base material. Examples of the slidability imparting step include a step of providing, between intermediate base materials that overlap each other, a substance that imparts slidability. In a case where the method for manufacturing the preform in accordance with the present embodiment includes no slidability imparting step, it is possible to maintain tackiness of an intermediate base material and allows a wrinkle and reinforcing fiber meandering to less occur during molding.

The following description will discuss the intermediate base material that is used in the method for manufacturing the preform, which method is an embodiment of the present invention.

<Intermediate Base Material>

The intermediate base material contains the reinforcing fiber base material and the matrix resin composition. For example, the intermediate base material can be obtained by impregnating the reinforcing fiber base material with the matrix resin composition.

(Reinforcing Fiber Base Material)

The reinforcing fiber material is a sheet-like or tape-like base material that is made of many reinforcing fibers. For convenience, the reinforcing fiber material that is relatively wide is referred to as a "sheet", and the reinforcing fiber material that is relatively narrow is referred to as a "tape". Note, however, that the reinforcing fiber base material is not limited in size and can be cut in accordance with the size of a molded article. Alternatively, a plurality of reinforcing fiber base materials can be combined and used.

Examples of a form of the reinforcing fiber base material include a form (unidirectional material) in which continuous fibers are unidirectionally aligned, a fabric form (cloth material) obtained by weaving continuous fibers, and a form in which reinforcing fibers are not woven.

A form of a unidirectional material in which continuous filaments are used and a form of a cloth material are preferable in order to achieve higher physical properties after molding.

The reinforcing fiber base materials can be used alone, or two or more thereof can be used in combination.

(Thickness of Reinforcing Fiber Base Material)

The reinforcing fiber base material has a thickness that is not particularly limited but is preferably within a range of 0.03 mm to 6 mm. The sheet that has a thickness of not less than 0.03 mm allows a preform to have excellent shape retainability. The thickness of the sheet has a lower limit of more preferably not less than 0.2 mm, and still more preferably not less than 0.4 mm. In addition, the sheet that has a thickness of not more than 6 mm allows a preform to have excellent preformability and allows a reduction in occurrence of a wrinkle in a molded article to be obtained.

The thickness of the sheet has an upper limit of more preferably not more than 5 mm, and still more preferably not more than 4 mm.

The thermosetting resin composition can further contain other component(s) in addition to the thermosetting resin (described earlier) and the curing agent (described earlier), provided that the effect of the present embodiment is brought about. The other component(s) can be of a single kind or can be of two or more kinds. Examples of the other component (s) include an auxiliary curing agent, a mold release agent, a defoaming agent, an ultraviolet absorber, and a filler.

(Reinforcing Fiber)

The reinforcing fiber is as has been described in (Reinforcing fiber) of [1-1. Prepreg sheet] (described earlier).

(Reinforcing Fiber Bundle)

The reinforcing fiber bundle is as has been described in (Reinforcing fiber bundle) of [1-1. Prepreg sheet] (described earlier).

(Matrix Resin Composition)

The matrix resin composition is as has been described in (Matrix resin composition) of [1-1. Prepreg sheet] (described earlier).

(Resin Content of Intermediate Base Material)

The intermediate base material has a resin content of preferably 20 mass % to 45 mass %, and more preferably 25 mass % to 40 mass %. The resin content that is not less than 20 mass % is preferable so that voids in the intermediate base material will be reduced. The resin content that is not more than 45 mass % is preferable so that the intermediate base material will have higher mechanical properties and so that the intermediate base material will be prevented from being too tacky. A resin of the resin content refers to a resin composition contained in the reinforcing fiber base material.

(Curing Agent)

The curing agent for the thermosetting resin is not particularly limited provided that the curing agent allows a curing reaction of the thermosetting resin to progress. Note, however, that the curing agent is preferably an amine-based curing agent that is a compound having an amino group, or an amine-based curing agent from which a compound having an amino group is produced by decomposition. This is because the amine-based curing agent allows the thermosetting resin that has been cured to have high physical properties. In order to achieve a higher curing speed, it is possible to use, as the curing agent, an imidazole compound having an imidazole ring, or to use, in combination with the imidazole compound, an urea compound serving as an auxiliary curing agent and having an urea group.

<Form of Intermediate Base Material>

Examples of the intermediate base material that is used in the method for manufacturing the preform in accordance with the present embodiment include sheet-like base materials such as a sheet-like base material formed of a plurality of arranged tape-like prepregs, a cloth prepreg, and a unidirectional prepreg.

The intermediate base materials can be used alone, or two or more thereof can be used in combination.

Types of the intermediate base materials will be described below.

(Method for Manufacturing Unidirectional Prepreg)

Examples of a method for manufacturing the sheet-like unidirectional prepreg include a hot melt method. According to the hot melt method, a thermosetting resin composition that has been made into a film is attached to reinforcing fiber bundles that are unidirectionally aligned, and then the reinforcing fiber bundles are impregnated with the thermosetting resin composition by heating and pressurization.

(Tape-Like Prepreg)

Examples of the tape-like prepreg include a slit tape and a tow prepreg. The slit tape can be prepared from a sheet-like unidirectional prepreg that is impregnated with a matrix resin composition in a state in which reinforcing fiber bundles are unidirectionally aligned. The slit tape is a tape-like prepreg prepared by cutting the unidirectional prepreg into a strip shape with use of a dedicated slitter. The slit tape and a method for manufacturing the slit tape are as has been described in (Slit tape) of [1-1. Prepreg sheet] (described earlier). The tow prepreg is defined as has been described in (Tow prepreg) of [1-1. Prepreg sheet] (described earlier). A method for manufacturing the tow prepreg is as has been described in (Method for manufacturing tow prepreg) of [1-1. Prepreg sheet] (described earlier).

(Cloth Prepreg)

The cloth prepreg is an intermediate base material in which the cloth material is impregnated with a matrix resin composition. The cloth material can be a cloth material having any of woven structures such as a unidirectional woven fabric in which reinforcing fibers are provided in a required direction; a bidirectional woven fabric such as a plain weave, a satin weave, or a twill weave; a triaxial fabric; and a noncrimp fabric. The plain weave, the twill weave, and the satin weave are particularly preferably used due to their excellence in shear deformation.

(Method for Manufacturing Cloth Prepreg)

The cloth prepreg can be manufactured by a method similar to the method, described earlier in the section (Method for manufacturing slit tape), for manufacturing the unidirectional prepreg.

[2-2. Method for Manufacturing Fiber-Reinforced Composite Material Molded Article]

Other examples of the method for manufacturing the fiber-reinforced composite material molded article in accordance with the present embodiment include a heating and pressurization step of subjecting a preform to heating and pressurization in a metal mold by using the method (described earlier) for manufacturing the preform. The matrix resin composition contained in the intermediate base material that is used to prepare the preform that is used here is a thermosetting resin composition.

<Heating and Pressurization Step>

The heating and pressurizations step is a molding step of curing the preform, at a temperature higher than or equal to a curing temperature of the thermosetting resin composition, by subjecting the preform to heating and pressurization. This makes it possible to obtain the molded article of the fiber-reinforced composite material which molded article has a desired stereoscopic shape and a good appearance.

In the heating and pressurization step, for example, the preform is provided in a lower mold of the metal mold whose temperature is adjusted in advance. Next, the metal mold is closed by bringing an upper mold of the metal mold, whose temperature is adjusted in advance, in proximity to the lower mold, so that the preform is subjected to pressurization. The metal mold has a temperature in a range of preferably 100° C. to 170° C., and more preferably 130° C. to 150° C., though depending on a curing temperature of the thermosetting resin composition to be used. The upper mold and the lower mold of the metal mold have respective temperatures that can be identical or different. Note, however, that the temperatures are preferably identical. The metal mold has a contact pressure of preferably 1 MPa to 15 MPa, and more preferably 4 MPa to 10 MPa during the molding. The preform is thus cured by being subjected to heating and pressurization with use of a mold. A molding time is preferably 1 minute to 15 minutes, and more preferably 2 minutes to 5 minutes, though depending on a time required for completion of curing of the thermosetting resin composition to be used. This results in obtainment of the molded article that has a predetermined shape. The molding time can be determined as appropriate in accordance with (i) productivity that the molded article is required to have and (ii) selection of a material for achieving the productivity. For example, in a case where a thermosetting resin for an automobile product (described earlier) is selected as appropriate, the molded article can be obtained by the heating and pressurization (described earlier) for 150 seconds to 600 seconds.

In the fiber-reinforced composite material molded article to be obtained by the method for manufacturing the fiber-reinforced composite material molded article in accordance with the present embodiment, a wrinkle and reinforcing fiber meandering are less likely to occur during the molding. This is because the preform is subjected to heating and pressurization and cured. A high-straightness reinforcing fiber allows the molded article to have a high strength. This allows the molded article that has no wrinkle and in which reinforcing fiber meandering less occurs to have a high strength. In addition, no striped pattern is produced due to a reinforcing fiber bundle after the molding. Thus, the method for manufacturing the fiber-reinforced composite material molded article in accordance with the present embodiment makes it possible to manufacture the fiber-reinforced composite material molded article that has a good appearance (excels in appearance).

[3-1. Method for Manufacturing Preform]

Further examples of the method for manufacturing the preform in accordance with the present embodiment include the first step and the second step in each of which at least one prepreg sheet described in [1-1. Prepreg sheet] (described earlier) or at least one covering material-attached prepreg sheet described earlier is used as the intermediate base material. The further examples of the method for manufacturing the preform in accordance with the present embodiment may further include the third step, and also may further include the fourth step.

(Intermediate Base Material)

The intermediate base material is as has been described in <Intermediate base material> of [2-1. Method for manufacturing preform] (described earlier).

(Prepreg Sheet)

The prepreg sheet is as has been described in [1-1. Prepreg sheet] (described earlier).

(Covering Material-Attached Prepreg Sheet)

The covering material-attached prepreg sheet is as has been described in [1-1. Prepreg sheet] (described earlier) and [1-2. Method for manufacturing prepreg sheet] (described earlier).

(First Step)

The first step is as has been described in <First step> of [2-1. Method for manufacturing preform] (described earlier).

(Second Step)

The second step is as has been described in <Second step> of [2-1. Method for manufacturing preform] (described earlier).

(Third Step)

The third step is as has been described in <Third step> of [2-1. Method for manufacturing preform] (described earlier).

(Fourth Step)

The fourth step is as has been described in <Fourth step> of [2-1. Method for manufacturing preform] (described earlier).

[3-2. Method for Manufacturing Fiber-Reinforced Composite Material Molded Article]

Further examples of the method for manufacturing the fiber-reinforced composite material molded article in accordance with an embodiment of the present invention include a method for manufacturing a molded article of a fiber-reinforced composite material by molding the preform obtained in [3-1. Method for manufacturing preform] (described earlier).

(Molding Step)

The molding step is as has been described in <Heating and pressurization step> of [2-2. Method for manufacturing fiber-reinforced composite material molded article] (described earlier).

(Cutting Step)

The cutting step is as has been described in <Other steps> of [2-1. Method for manufacturing preform].

(Elevation Structure)

The elevation structure is as has been described in (Elevation structure) of [2-1. Method for manufacturing preform].

(Slidability Imparting Step)

The slidability imparting step is as has been described in <Second step> of [2-1. Method for manufacturing preform] (described earlier).

The preform to be obtained by the method for manufacturing the preform in accordance with the present embodiment is manufactured with use of the prepreg sheet. Thus, a wrinkle and reinforcing fiber meandering are less likely to occur in the preform thus manufactured. In addition, the preform has aligned ends.

In the fiber-reinforced composite material molded article to be obtained by the method for manufacturing the fiber-reinforced composite material molded article in accordance with the present embodiment, a wrinkle and reinforcing fiber meandering are less likely to occur during the molding, and ends of the fiber-reinforced composite material molded article are aligned. This is because the preform is subjected to heating and pressurization and cured. A high-straightness reinforcing fiber allows the molded article to have a high strength. This allows the molded article that has no wrinkle and in which reinforcing fiber meandering less occurs to have a high strength. In addition, during the molding, a reduction in viscosity of the matrix resin composition causes a prepreg tape of the prepreg sheet to be moved and deformed. Thus, after the molding, the shape of a reinforcing fiber bundle contained in the prepreg sheet hardly remains, and no striped pattern is produced due to the reinforcing fiber bundle. Therefore, the method for manufacturing the fiber-reinforced composite material molded article in accordance with the present embodiment makes it possible to manufacture the fiber-reinforced composite material molded article that has a good appearance (excels in appearance), in which fiber meandering less occurs, and that has a high strength due to continuous filaments used in the fiber-reinforced composite material molded article.

Aspects of the present invention can also be expressed as follows:

A prepreg sheet in accordance with a first aspect of the present invention includes: a plurality of prepreg tapes that are juxtaposed to each other and each of which contains a reinforcing fiber bundle and a matrix resin composition, the plurality of prepreg tapes being provided such that adjacent prepreg tapes of the plurality of prepreg tapes overlap each other at respective lateral edge portions of the adjacent prepreg tapes. The first aspect makes it possible to achieve a prepreg sheet from which a fiber-reinforced composite material molded article having a good appearance and a high strength can be manufactured and that is highly handleable.

A prepreg sheet in accordance with a second aspect of the present invention is preferably configured such that a test piece that (i) has a side that is substantially parallel to an orientation direction of a prepreg tape of the plurality of prepreg tapes and (ii) has a square planar shape having a length of 15 cm and a width of 15 cm is cut out from the prepreg sheet, and in a case where a side edge portion including the side is lifted so that the side of the test piece is made horizontal, the test piece maintains, for not less than 30 seconds, a shape that the test piece had before being lifted. The second aspect makes it possible to achieve a prepreg sheet that has sheet self-sustainability.

In a third aspect of the present invention, a prepreg sheet can be configured such that, in the first or second aspect of the present invention, the adjacent prepreg tapes overlap each other for a length that is not more than 50% of a width of a prepreg tape 100 of the adjacent prepreg tapes. The third aspect is more effective in order to achieve both (i) a good appearance without any striped pattern and (ii) productivity.

In a fourth aspect of the present invention, a prepreg sheet can be configured such that, in the first to third aspects of the present invention, the adjacent prepreg tapes overlap each other for a length that is not less than 1% of a width of a prepreg tape of the adjacent prepreg tapes. The fourth aspect is more effective so that a good appearance will be sufficiently exhibited.

In a fifth aspect of the present invention, a prepreg sheet can be configured such that, in the first to fourth aspects of the present invention, the adjacent prepreg tapes overlap each other for a length of not less than 1.0 mm. The fifth aspect is more effective so that handleability of a prepreg sheet and moldability of a preform will be sufficiently exhibited.

In a sixth aspect of the present invention, a prepreg sheet can be configured such that, in any one of the first to fifth aspects of the present invention, the adjacent prepreg tapes are identical in width. The sixth aspect is more effective in order to easily control arrangement (overlapping) of prepreg tapes of a prepreg sheet.

In a seventh aspect of the present invention, a prepreg sheet can be configured such that, in any one of the third to fifth aspects of the present invention, the plurality of prepreg tapes include prepreg tapes that have respective different widths, and the length for which the adjacent prepreg tapes overlap with each other is based on a narrower one of the adjacent prepreg tapes. The seventh aspect is more effective in order to achieve overlap of prepreg tapes adjacent ones of which overlap each other for a sufficient length.

In an eighth aspect of the present invention, a prepreg sheet can be configured such that, in any one of the first to seventh aspects of the present invention, the prepreg sheet is used for an automobile member.

A covering material-attached prepreg sheet in accordance with a ninth aspect of the present invention, includes: a covering material; and a prepreg sheet provided on the covering material. The prepreg sheet includes a plurality of prepreg tapes that are juxtaposed to each other. The plurality of prepreg tapes each contain a reinforcing fiber bundle and a matrix resin composition, and the plurality of prepreg tapes are provided such that adjacent prepreg tapes of the plurality of prepreg tapes overlap each other at respective lateral edge portions of the adjacent prepreg tapes. The ninth aspect brings about an effect similar to that brought about by the first aspect described earlier.

A method for manufacturing a prepreg sheet in accordance with a tenth aspect of the present invention includes: manufacturing the prepreg sheet by providing a plurality of prepreg tapes, in each of which a reinforcing fiber bundle is impregnated with a matrix resin composition, such that adjacent prepreg tapes of the plurality of prepreg tapes overlap each other at respective lateral edge portions of the adjacent prepreg tapes. The tenth aspect brings about an effect similar to that brought about by the first aspect described earlier.

A method for manufacturing a preform in accordance with an eleventh aspect of the present invention includes: obtaining a preform by preforming at least one prepreg sheet in accordance with any one of the first to eighth aspects of the present invention, or a laminated sheet, which is a laminate including one or more of the at least one prepreg sheet. The eleventh aspect brings about an effect similar to that brought about by the first aspect described earlier.

A method for manufacturing a fiber-reinforced composite material molded article in accordance with a twelfth aspect of the present invention is a method for manufacturing a molded article of a fiber-reinforced composite material by molding at least one prepreg sheet in accordance with any one of the first to eighth aspects of the present invention. The method is configured such that the matrix resin composition is a thermosetting resin composition, and the method includes: a preforming step of preparing a preform by preforming the at least one prepreg sheet or a laminated sheet, which is a laminate including one or more of the at least one prepreg sheet, into a shape that is close to a shape of the fiber-reinforced composite material molded article; and a molding step of curing the preform by subjecting the preform to heating and pressurization in a mold whose temperature is adjusted to a temperature higher than or equal to a curing temperature of the thermosetting resin composition. The twelfth aspect makes it possible to achieve a fiber-reinforced composite material molded article having a good appearance and a high strength.

A fiber-reinforced composite material molded article in accordance with a thirteenth aspect of the present invention is a cured product of the prepreg sheet in accordance with any one of the first to eighth aspects of the present invention. The thirteenth aspect brings about an effect similar to that brought about by the eleventh aspect.

A fiber-reinforced composite material molded article in accordance with a fourteenth aspect of the present invention can be configured such that the fiber-reinforced composite material molded article is used for an automobile member.

Note that, a prepreg sheet in accordance with the present embodiment can be configured such that, in any one of the first to eighth aspects of the present invention, the prepreg sheet includes a laminated sheet, and prepreg sheets that are adjacent to each other in a lamination direction are provided so that a prepreg tape of one of the prepreg sheets intersects a prepreg tape of the other one of the prepreg sheets when the prepreg sheets are viewed from above. Such an aspect is more effective so that each of a preform and a fiber-reinforced composite material molded article can have a sufficient strength.

A method for manufacturing a preform in accordance with a fifteenth aspect of the present invention includes: a first step of manufacturing a primary premolded article by placing, in a preform mold, one or more intermediate base materials and preforming the one or more intermediate base materials, the one or more intermediate base materials each containing a reinforcing fiber base material and a matrix resin composition; and a second step of manufacturing a secondary premolded article by placing the one or more intermediate base materials on the primary premolded article, which is placed in the preform mold, and preforming the primary premolded article and the one or more intermediate base materials, the secondary premolded article being obtained as the preform. The fifteenth aspect makes it possible to manufacture a preform from which a fiber-reinforced composite material molded article having a good appearance and a high strength can be manufactured.

A method for manufacturing a preform in accordance with a sixteenth aspect of the present invention can be configured to, in the fifteenth aspect of the present invention, further include: a third step of carrying out, one or more times, a step of manufacturing a thicker secondary premolded article by placing the one or more intermediate base materials on the secondary premolded article, which is placed in the preform mold, and preforming the secondary premolded article and the one or more intermediate base materials. The sixteenth aspect makes it possible to (i) manufacture a secondary premolded article having a larger thickness and a greater weight and (ii) manufacture a preform from which a fiber-reinforced composite material molded article having a good appearance and a high strength can be manufactured.

A method for manufacturing a preform in accordance with a seventeenth aspect of the present invention is configured to, in the fifteenth or sixteenth aspect of the present invention, further include: a fourth step of partially fixing, relative to the primary premolded article or the secondary premolded article, the one or more intermediate base materials that are placed on the primary premolded article or the secondary premolded article. According to the seventeenth aspect, an intermediate base material that is being preformed is deformed, based on a fixed part thereof, so as to follow respective inner surfaces of an upper mold and a lower mold. Thus, the seventeenth aspect is effective in preventing or reducing occurrence of a wrinkle.

A method for manufacturing a preform in accordance with an eighteenth aspect of the present invention can be configured such that, in the seventeenth aspect of the present invention, in the fourth step, the one or more intermediate base materials are partially fixed relative to the primary premolded article or the secondary premolded article due to tackiness of the one or more intermediate base materials. According to the eighteenth aspect, a part of an intermediate base material is fixed with use of tackiness (adhesiveness) of the intermediate base material. This makes it possible to conveniently and easily fix the part relative to a primary premolded article or a secondary premolded article.

A method for manufacturing a preform in accordance with a nineteenth aspect of the present invention can be configured such that, in the eighteenth aspect of the present invention, the one or more intermediate base materials are fixed due to tackiness of the one or more intermediate base materials by one or more methods selected from the group consisting of heating, pressurization, and vacuum degassing. The nineteenth aspect brings about an effect similar to that brought about by the eighteenth aspect described earlier.

A method for manufacturing a preform in accordance with a twentieth aspect of the present invention can be configured such that, in the seventeenth aspect of the present invention, in the fourth step, the one or more intermediate base materials are partially fixed relative to the primary premolded article or the secondary premolded article by adhesion. The twentieth aspect makes it possible to fix an intermediate base material without the need for any special device.

A method for manufacturing a preform in accordance with a twenty-first aspect of the present invention can be configured to, in any one of the fifteenth to twentieth aspects of the present invention, further include: a step of cutting the one or more intermediate base materials into a desired shape before the one or more intermediate base materials are placed on the primary premolded article or the secondary premolded article. The twenty-first aspect makes it possible to allow the shape (in particular, dimensions) of a preform to be the shape (dimensions) substantially identical to a desired shape of a molded article.

A method for manufacturing a preform in accordance with a twenty-second aspect of the present invention can be configured such that, in any one of the fifteenth to twenty-first aspects of the present invention, one or more base materials selected from the group consisting of a sheet-like base material formed of a plurality of arranged tape-like prepregs, a cloth prepreg, and a unidirectional prepreg is used as the one or more intermediate base materials. The twenty-second aspect brings about an effect similar to that brought about by the fifteenth aspect described earlier.

A method for manufacturing a preform in accordance with a twenty-third aspect of the present invention can be configured such that, in any one of the fifteenth to twenty-second aspects of the present invention, a preform mold having an elevation structure is used as the preform mold. The twenty-third aspect makes it possible to manufacture a preform having a more complicated three-dimensional shape.

A method for manufacturing a preform in accordance with a twenty-fourth aspect of the present invention is preferably configured such that, in any one of the fifteenth to twenty-third aspects of the present invention, the method includes no step of imparting slidability to the one or more intermediate base materials. The twenty-fourth aspect makes it possible to maintain tackiness of an intermediate base material and allows a wrinkle and reinforcing fiber meandering to less occur during molding.

A method for manufacturing a fiber-reinforced composite material molded article in accordance with a twenty-fifth aspect of the present invention includes: a step of manufacturing a preform by a method for manufacturing a preform in accordance with any one of the fifteenth to twenty-fourth aspects of the present invention; and a step of subjecting the preform to heating and pressurization in a metal mold. The twenty-fifth aspect makes it possible to manufacture a fiber-reinforced composite material molded article that has a good appearance (excels in appearance).

A method for manufacturing a preform in accordance with a twenty-sixth aspect of the present invention is configured such that, in any one of the fifteenth to twenty-fourth aspects of the present invention, at least one prepreg sheet in accordance with any one of the first to eighth aspects of the present invention or at least one covering material-attached prepreg sheet in accordance with the ninth aspect of the present invention is used as the one or more intermediate base materials. The twenty-sixth aspect brings about an effect similar to that brought about by the fifteenth aspect described earlier.

A method for manufacturing a fiber-reinforced composite material molded article in accordance with a twenty-seventh aspect of the present invention includes: a step of manufacturing a preform by using, in a method for manufacturing a preform in accordance with the twenty-sixth aspect of the present invention, the one or more intermediate base materials each containing a thermosetting resin composition as the matrix resin composition; and a molding step of curing the preform by subjecting the preform to heating and pressurization at a temperature higher than or equal to a curing temperature of the thermosetting resin composition. The twenty-seventh aspect makes it possible to manufacture a fiber-reinforced composite material molded article that has a good appearance (excels in appearance).

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

The following description will discuss Examples of the present invention in detail. However, the present invention is not limited to Examples. Unless otherwise noted, all mixing ratios of materials (raw materials) are represented by parts by mass. In Examples and Comparative Examples, a floor pan of an automobile was molded from a prepreg sheet.

Example 1

A prepreg tape prepared in Example 1 was obtained by impregnating a carbon fiber bundle (manufactured by Mitsubishi Chemical Corporation; product name: TR50S) with a matrix resin composition. The matrix resin composition was a mixture in which jER828 and an epoxy resin prepolymer were mixed at a ratio of 86.9:13.1 (unit: parts by mass). The epoxy resin prepolymer was prepared according to the method of manufacturing component D-2 disclosed in Japanese Patent No. 5682838. The matrix resin composition was heated at 100° C., and the viscosity measured at approximately room temperature (30° C.) with use of a B-type viscometer was 35,000 Pa·s, and the curing completion time measured at 140° C. with use of a curelastometer was 5 minutes. In addition, the glass transition point Tg of the matrix resin composition was 170° C. The width and thickness of the prepreg tape were 12.7 mm and 0.22 mm, respectively. The resin content of the prepreg tape was 30% by mass.

A prepreg sheet having dimensions of 600 mm×600 mm was manufactured by placing prepreg tapes such that adjacent prepreg tapes overlap each other at respective lateral edge portions by an overlapping length of 0.5 mm as illustrated in FIG. 4. Two layers of this prepreg sheet were laminated such that the orientation directions of the prepreg tapes intersect at right angles)(0°/90°. In this way, the laminated sheet of the prepreg sheets in accordance with Example 1 was prepared. The overlapping length was 3.9% of the width of each prepreg tape.

(Debulking)

The laminated sheet was carried onto a flat workbench, and was covered with a debulking device (T-7 seal system; manufactured by TORR SCIENCE CO., Ltd.). Then, the laminated sheet was debulked by using a vacuum pump to cause the inside of the debulking device to be in a state of reduced pressure. The conditions for the state of reduced pressure were: a vacuum pressure of 700 mmHg; and a pressure-reduction time of 5 minutes. Then, the internal pressure of the debulking device was returned to an atmospheric pressure, so that the debulked laminated sheet was obtained.

(Preforming)

The debulked laminated sheet was placed on the opening of a female mold that has a cavity having an open upper surface, and was then heated for 30 seconds at 70° C. with use of a movable infrared heater. Then, a male mold attached to the simple molding machine was lowered, and the laminated sheet was sandwiched between the female mold and the male mold at 0.5 MPa. In this way, the debulked laminated sheet was preformed. Thereafter, the female mold and the male mold were cooled by blowing air thereto. This prepared a preform. The male mold was lifted, and the preform was taken out from the cavity of the female mold. In this way, a preform having a shape close to the stereoscopic shape of a molded article was prepared. Five of the preforms were prepared, and were further laminated to form [0°/90°]$_5$. Then, the laminate was subjected to the preforming step again, so that the preform in accordance with Example 1 was prepared.

(Trimming)

The preform in accordance with Example 1 was placed on a trimming jig, and the outer circumference of the preform was fixed. Then, the preform was cut along the groove of the trimming jig with use of a cutter, so that the preform having dimensions identical to those of the molded article was manufactured.

(Molding)

The preform obtained was placed in the lower mold of molds, the temperature of which had been adjusted to 140° C. by coating the lower mold with a mold release agent in advance. The preform was sandwiched by the upper mold of the molds, the temperature of which had been adjusted to 140° C. in advance. Then, the preform was subjected to heating and pressurization so as to be cured. This produced the molded article in accordance with Example 1, which was to serve as a floor pan of an automobile. As a mold release agent, Frelease 65 (manufactured by NEOS COMPANY LIMITED) was used.

Example 2

The prepreg sheet in accordance with Example 2, the preform in accordance with Example 2, and the molded article in accordance with Example 2 were obtained as in Example 1 except that the overlapping length of the prepreg tapes was changed to 1.0 mm (7.9%).

Example 3

The prepreg sheet in accordance with Example 3, the preform in accordance with Example 3, and the molded article in accordance with Example 3 were obtained as in Example 1 except that the overlapping length of the prepreg tapes was changed to 1.5 mm (11.8%).

Example 4

The prepreg sheet in accordance with Example 4, the preform in accordance with Example 4, and the molded article in accordance with Example 4 were obtained as in Example 1 except that the overlapping length of the prepreg tapes was changed to 2.0 mm (15.7%).

Example 5

The prepreg sheet in accordance with Example 5 and the preform in accordance with Example 5 were obtained as in Example 1 except that (i) the overlapping length of the prepreg tapes was changed to 3.0 mm (23.6%) and (ii) the lamination structure was set to [0°/90°].

Example 6

The prepreg sheet in accordance with Example 6 and the preform in accordance with Example 6 were obtained as in Example 1 except that (i) the overlapping length of the prepreg tapes was changed to 4.0 mm (31.5%) and (ii) the lamination structure was set to [0°/90°].

Example 7

The prepreg sheet in accordance with Example 7 and the preform in accordance with Example 7 were obtained as in Example 1 except that (i) the overlapping length of the prepreg tapes was changed to 6.0 mm (47.2%) and (ii) the lamination structure was set to [0°/90°].

Example 8

The prepreg sheet in accordance with Example 8 and the preform in accordance with Example 8 were obtained as in Example 2 except that the lamination form of the prepreg tapes was changed to that illustrated in FIG. 2.

Example 9

The prepreg sheet in accordance with Example 9 and the preform in accordance with Example 9 were obtained as in Example 2 except that the prepreg tapes described earlier and other prepreg tapes having a different width were arranged alternately. The other prepreg tapes have compositions identical to those of the prepreg tapes described earlier. The width of the other prepreg tapes was 6.3 mm. The overlapping length of the other prepreg tapes was 1.0 mm (15.9%).

Visual observation of the cross sections of the prepreg sheets before and after the debulking in Example 1 to Example 9 confirmed that in the unit layer of any of the prepreg sheets, the reinforcing fiber bundle was distributed so as to form unevenness corresponding to the overlapping of the prepreg tapes.

Comparative Example 1

The prepreg sheet in accordance with Comparative Example 1, the preform in accordance with Comparative Example 1, and the molded article in accordance with Comparative Example 1 were obtained as in Example 1 except that the prepreg sheet, which was a single and integrated prepreg sheet having a composition identical to that of the prepreg tapes of Example 1, was used instead of the prepreg tapes.

Comparative Example 2

The prepreg sheet in accordance with Comparative Example 2, the preform in accordance with Comparative Example 2, and the molded article in accordance with Comparative Example 2 were obtained as in Example 1 except that the laminated sheet was prepared by laminating, at [0°/90°], the prepreg tapes which were placed such that gaps between adjacent prepreg tapes were 6.0 mm.

Comparative Example 3

The prepreg sheet in accordance with Comparative Example 3, the preform in accordance with Comparative Example 3, and the molded article in accordance with Comparative Example 3 were obtained as in Example 1 except that the overlapping length of the prepreg tapes was changed to 0.1 mm (0.8%).

Comparative Example 4

The prepreg sheet in accordance with Comparative Example 4 and the preform in accordance with Comparative Example 4 were obtained as in Example 1 except that the overlapping length of the prepreg tapes was changed to 7.5 mm (59.1%).

[Evaluation of Preform]

A plurality of experienced technical experts observed the preforms in accordance with Examples 1 to 9 and Comparative Examples 1 to 4, and evaluated the following four characteristics of the preforms according to the criteria for each of the characteristics.

Evaluation (1): Sheet Form Retention Properties

A: During the lamination to form the sheet, the adhesion at lap parts of tows was sufficient, so that the shape of the sheet was not distorted.

B: Only with the lamination, the tows were easily peeled, so that it was necessary to cause the sheets to adhere to each other by an operation such as vacuuming.

C: Even with, for example, the vacuuming carried out, the tows came apart and were peeled, so that it was not possible to retain the shape of the sheet.

Evaluation (2): Properties to Follow the Shape of the Mold

A: The tows were deformed and moved so as to follow the shapes of the molds.

B: Although wrinkles occurred, the wrinkles were expected to be reduced by press molding, and were therefore acceptable.

C: The deformation and movements of the tows were insufficient so as to produce wrinkles to such an extent that large wrinkles would remain even after the press molding.

Evaluation (3): Wrinkles at Central Portion

A: Due to sufficient deformations and movements of tows, no wrinkles were observed at the central portion of a floor, which central portion included unevenness in the molded article.

B: Although wrinkles were slightly observed in the central portion of the floor, the extent of the wrinkles was such that the wrinkles would be reduced by press molding.

C: Deep and severe wrinkles occurred in the central portion of the floor, so that it was difficult to carry out press molding.

Evaluation (4): Fiber Meandering During Preforming

A: Neither fiber meandering nor fiber twisting during preforming was observed.

B: Although slight fiber meandering or fiber twisting during preforming was observed, the extent thereof was acceptable.

C: Extreme fiber meandering or fiber twisting during preforming was observed.

Table 1 shows the widths of the tapes, overlapping widths, and evaluation results of the preforms in accordance with Examples 1 to 9 and Comparative Examples 1 to 4.

TABLE 1

| | Tape width (mm) | Overlapping width (mm) | Overlapping width (%) | Evaluation (1) | Evaluation (2) | Evaluation (3) | Evaluation (4) |
|---|---|---|---|---|---|---|---|
| Example 1 | 12.7 | 0.5 | 3.9 | B | A | B | B |
| Example 2 | 12.7 | 1.0 | 7.9 | A | A | A | A |
| Example 3 | 12.7 | 1.5 | 11.8 | A | A | A | A |
| Example 4 | 12.7 | 2.0 | 15.7 | A | A | A | A |
| Example 5 | 12.7 | 3.0 | 23.6 | A | A | A | A |
| Example 6 | 12.7 | 4.0 | 31.5 | A | B | B | B |
| Example 7 | 12.7 | 6.0 | 47.2 | A | B | B | B |
| Example 8 | 12.7 | 1.0 | 7.9 | A | A | A | A |
| Example 9 | 12.7 | 1.0 | 7.9 | A | A | A | A |
| | 6.3 | 1.0 | 15.9 | | | | |
| Comparative Example 1 | — | — | — | A | C | C | C |
| Comparative Example 2 | 12.7 | — | — | C | A | B | B |
| Comparative Example 3 | 12.7 | 0.1 | 0.8 | C | A | A | A |
| Comparative Example 4 | 12.7 | 7.5 | 59.1 | A | C | C | B |

[Evaluation of Molded Article]

A plurality of experienced technical experts observed the molded articles in accordance with Examples 1 to 4 and Comparative Examples 1 to 3, and evaluated the following four characteristics of the preforms according to the criteria for each of the characteristics. Note that the term "lap" of a lap mark refers to a part where prepreg tapes of a prepreg sheet overlap each other in a molded article. In addition, the term "fiber meandering in a molded article" means meandering of reinforcing fibers in a reinforcing fiber bundle that occurs due to flowing of a thermosetting resin during the molding step. In addition, the "appearance of a molded article" is affected by wrinkles mainly during preforming.

Evaluation (5): Lap Mark of Molded Article

A: The lap parts of tows by press molding were hardly confirmed by visual observation, and the surface of the molded article was sufficiently smooth.

B: Although the lap parts generated during lamination and preforming were easily confirmed by visual observation, the surface was smooth.

C: Even after the press molding the lap mark made during the lamination and preforming remained clearly, and smoothness of the surface was also lacking.

Evaluation (6): Fiber Meandering of Molded Article

A: Reinforcing fiber meandering was suppressed.

B: Slight reinforcing fiber meandering occurred.

C: There was a part(s) where reinforcing fiber meandering occurred notably more in comparison with a surrounding area.

Evaluation (7): Appearance of Molded Article

A: The appearance was good, or was at an acceptable level despite wrinkles and meandering at portions.

B: Either at least one C was included or at least two Bs were included in the above evaluations.

Table 2 shows the widths of the tapes, overlapping widths, and evaluation results of the molded articles in accordance with Examples 1 to 4, 12, and 14 and Comparative Examples 1 to 3.

TABLE 2

| | Tape width (mm) | Overlapping width (mm) | Overlapping width (%) | Evaluation (5) | Evaluation (6) | Evaluation (7) |
|---|---|---|---|---|---|---|
| Example 1 | 12.7 | 0.5 | 3.9 | A | B | A |
| Example 2 | 12.7 | 1.0 | 7.9 | A | A | A |
| Example 3 | 12.7 | 1.5 | 11.8 | A | A | A |
| Example 4 | 12.7 | 2.0 | 15.7 | A | A | A |
| Example 12 | 12.7 | 1.0 | 7.9 | A | A | A |
| Example 14 | 12.7 | — | — | — | B | B |
| Comparative Example 1 | 12.7 | — | 0 | A | C | B |
| Comparative Example 2 | 12.7 | — | 0 | — | C | B |
| Comparative Example 3 | 12.7 | 0.1 | 0.8 | A | A | A |

As is clear from Table 1, the preforms in accordance with Examples 1 to 9 sufficiently exhibited excellence in any of the following evaluated characteristics: the sheet form retention properties, the properties to follow the shapes of molds, wrinkles at a central portion, and fiber meandering during preforming. In addition, as is clear from Table 2, the molded articles in accordance with Examples 1 to 4 sufficiently exhibited excellence in any of the following evaluated characteristics: the lap marks, the fiber meandering, and the appearance. This is presumably because the prepreg sheets were formed such that a plurality of prepreg tapes were overlapping moderately at their side portions. More specifically, the advantages of providing the prepreg tapes with a moderate overlapping length are presumably as follows.

In each of Examples 1 to 9, a single prepreg sheet having no gaps was obtained, and this prepreg sheet was folded at parts where the prepreg tapes overlap each other. This allows the shape retainability and excellent handleability of the prepreg sheets and of the laminated sheet to be excellent.

In the preforms in accordance with Examples 1 to 9, the shapes of the prepreg tapes were remaining on the cross sections. That is, the preforms in accordance with Examples 1 to 9 had differences in level in the shapes of surfaces due to the overlapping of the prepreg tapes. Therefore, with the preforms in accordance with Examples 1 to 9, the unevenness (difference in level) on the surface of the prepreg sheet serves as a passage through which air passes, so as to make it easy to carry out degassing during debulking of the prepreg tapes, in contrast to general preforms in which blocking of a vent for the air may prevent degassing during debulking of prepreg tapes.

In addition, there is a part that is slightly lifted from the mold even after the preforming (preforming step). Starting from such a part, therefore, the preform can be easily removed from the mold.

Furthermore, the unevenness on the surface of the prepreg sheet serves as channels through which a matrix resin passes during molding. Therefore, the matrix resin can easily flow through the channels during molding. This causes the amount of flow of the matrix resin during the molding to slightly increase, and causes the matrix resin to flow through the channels along the prepreg tapes. Therefore, fiber meandering, which occurs due to the flow of the matrix resin, is unlikely to occur.

Furthermore, in Examples 1 to 4, observation of the cross sections of the molded articles confirmed that the shapes of the prepreg tapes disappeared. This was also true for the cross section of a molded article of an ordinary prepreg. In addition, because there were no gaps between the prepreg tapes, substantially no striped pattern was observed when the molded article was seen through. The appearances of the molded articles in accordance with Examples 1 to 4 were thus good.

In Comparative Example 1, in contrast, the evaluations of the characteristics of the preform were insufficient except for the evaluation of the shape retainability of the prepreg sheet. In addition, the evaluation of fiber meandering of the molded article was also insufficient. This is presumably because (i) the prepreg sheet in accordance with Comparative Example 1 was a single prepreg sheet so that the reinforcing fibers were unable to freely flow and were therefore unable to follow the three-dimensional shape and (ii) there was no channel for the resin so that the fibers moved along the resin flow during the molding.

In Comparative Example 2, the prepreg tapes were provided with a space therebetween, so that no prepreg sheet was obtained. Therefore, evaluations were made for the step for the laminated sheet and the subsequent steps. In Comparative Example 2, the fiber meandering of the molded article was notable. This is considered as a result of notable movements of the prepreg tapes.

In Comparative Example 3, the prepreg tapes in the prepreg sheet were peeled so as to cause the sheet to decompose. The shape retainability was therefore insufficient. This is presumably because the overlapping length of the prepreg tapes in the prepreg sheet was insufficient.

In Comparative Example 4, the overlapping width was overly large. This resulted in a portion where substantially three prepreg tapes were laminated, so that the prepreg sheet became rigid. The properties to follow the mold were poor. Wrinkles occurred in a large amount to the preform, and therefore made it impossible to carry out molding.

Example 10

A prepreg tape prepared in Example 10 was obtained by impregnating a carbon fiber bundle (manufactured by Mitsubishi Chemical Corporation; product name: TR50S15L) with a matrix resin composition. The matrix resin composition was a mixture in which jER828 and an epoxy resin prepolymer were mixed at a ratio of 86.9:13.1 (unit: parts by mass). The epoxy resin prepolymer was prepared according to the method of manufacturing component D-2 disclosed in Japanese Patent No. 5682838. The matrix resin composition was heated at 100° C., and the viscosity measured at approximately room temperature (30° C.) with use of a B-type viscometer was 35,000 Pa·s, and the curing completion time measured at 140° C. with use of a curelastometer was 5 minutes. In addition, the glass transition point Tg of the matrix resin composition was 170° C. The width and thickness of the prepreg tape were 15 mm and 0.22 mm, respectively.

A prepreg sheet having dimensions of 600 mm×600 mm was manufactured by placing prepreg tapes such that adjacent prepreg tapes overlap each other at respective lateral edge portions by an overlapping length (overlapping width) of 0.1 mm as illustrated in FIG. 4. Likewise, the prepreg sheets having overlapping lengths of 0.5 mm, 1.0 mm, and 6.0 mm, respectively, were prepared. The prepreg sheets were prepared at 22° C. indoors.

[Evaluation of Prepreg Sheet]

From the prepreg sheet prepared, a test piece was cut out. The test piece had a square planar shape having a length of 15 cm and a width of 15 cm. The test piece had a side that was substantially parallel to the orientation direction of the prepreg tapes. Then, with use of a debulking device such as the one illustrated in FIG. 5, the test piece was fixed by vacuum degassing for 5 minutes. The test piece thus fixed by vacuum degassing was evaluated for three characteristics below, according to the criteria for each of the characteristics.

Evaluation (8): Sheet Form Retention Properties (while Lifting for 30 Seconds)

A: When a side edge portion of the test piece was lifted so that a side included in the side edge portion was made horizontal, the test piece maintained, for not less than 30 seconds, a shape that the test piece had before being lifted.

B: When a side edge portion of the test piece was lifted so that a side included in the side edge portion was made horizontal, the test piece maintained, for not less than 5 seconds but less than 30 seconds, a shape that the test piece had before being lifted.

C: When a side edge portion of the test piece was lifted so that a side included in the side edge portion was made horizontal, the prepreg tapes constituting the test piece came apart in less than 5 seconds.

Evaluation (9): Sheet Form Retention Properties (Rotation)

A: When a side edge portion of the test piece was lifted so that a side included in the side edge portion was made horizontal, the test piece maintained a shape that the test piece had before being lifted although the test piece was rotated 3 times with the side edge portion serving as the axis.

B: When a side edge portion of the test piece was lifted so that a side included in the side edge portion was made horizontal, (i) the test piece maintained a shape that the test piece had before being lifted although the test piece was rotated once with the side edge portion serving as the axis and (ii) the test piece failed to maintain the shape before the test piece was rotated 3 times.

C: When a side edge portion of the test piece was lifted so that a side included in the side edge portion was made horizontal, the prepreg tapes constituting the test piece came apart before the test piece was rotated once with the side edge portion serving as the axis.

Evaluation (10): Sheet Retainability

A: When it was attempted to peel adjacent ones of the prepreg tapes constituting the test piece, the overlapping portions (lap parts) were firm so that the prepreg tapes were difficult to peel. When the tapes were forcefully peeled, the overlapping portions were fuzzy. That is, the sheet retainability was high.

B: When it was attempted to peel, with pressure, adjacent ones of the prepreg tapes constituting the test piece, the prepreg tapes were peeled without the overlapping portions becoming fuzzy. That is, the sheet retainability was low.

C: It was possible to easily peel, without pressure, adjacent ones of the prepreg tapes constituting the test piece. That is, the sheet retainability was remarkably low.

Evaluation (11): Sheet Self-Sustainability

A: Each of the characteristics (1) to (3) was evaluated as A, which indicates that the test piece had excellent sheet self-sustainability.

B: One or two of the characteristics (1) to (3) was/were evaluated as A, which indicates that the test piece had sheet self-sustainability.

C: None of the characteristics (1) to (3) was evaluated as A, which indicates that the test piece had no sheet self-sustainability.

Table 3 shows the results of evaluation of sheet self-sustainability for each overlapping width.

TABLE 3

| Overlapping width (mm) | Evaluation (8) | Evaluation (9) | Evaluation (10) | Evaluation (11) |
| --- | --- | --- | --- | --- |
| 0.1 | C | C | C | C |
| 0.5 | A | A | B | B |
| 1.0 | A | A | A | A |
| 6.0 | A | A | A | A |

Table 3 revealed that when the overlapping length of adjacent prepreg tapes (overlapping width) is greater than or equal to 0.5 mm, the prepreg sheet has sheet self-sustainability. In particular, when the overlapping length of adjacent prepreg tapes (overlapping width) is greater than or equal to 1.0 mm, the prepreg sheet has excellent sheet self-sustainability.

Unless otherwise noted, all mixing ratios of materials (raw materials) are represented by parts by mass. In Examples and Comparative Examples of the present application, preforms for an automobile floor pan such as the one illustrated in FIG. 11 were manufactured from prepreg sheets.

Example 11

(Manufacturing of Intermediate Base Material (Tape-Like Prepreg))

An intermediate base material prepared in Example 11 was obtained by impregnating, with a matrix resin composition, a carbon fiber bundle (manufactured by Mitsubishi Chemical Corporation; product name: TR50S) which was a reinforcing fiber base material. The matrix resin composition was a mixture in which jER828 and an epoxy resin prepolymer were mixed at a ratio of 86.9:13.1 (unit: parts by mass). The epoxy resin prepolymer was prepared according to the method of manufacturing component D-2 disclosed in Japanese Patent No. 5682838. The matrix resin composition was heated at 100° C., and the viscosity measured at approximately room temperature (30° C.) with use of a B-type viscometer was 35,000 Pa·s, and the curing completion time measured at 140° C. with use of a curelastometer was 5 minutes. In addition, the glass transition point Tg of the matrix resin composition was 170° C. The thickness of the tape-like prepregs (prepreg tapes) was 0.22 mm.

(Cutting of Intermediate Base Material)

A cutting device illustrated in FIG. 5 was used to cut the intermediate base material into a tape-like shape having a width of 12.7 mm.

(Preparation of Sheet-Like Prepreg)

Figure 10:
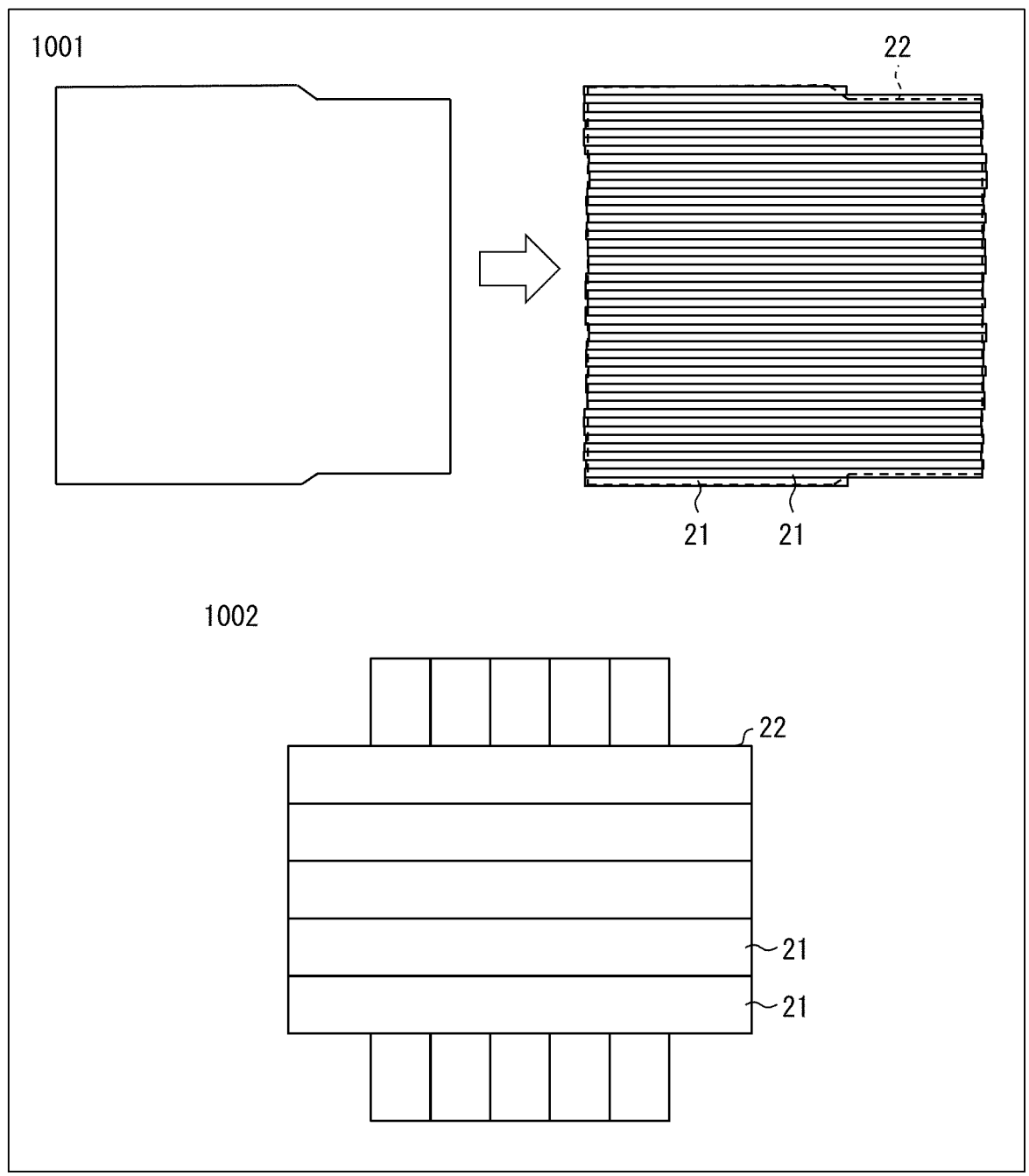
FIG. 10 is a view schematically illustrating an example of how to provide the intermediate base material in the primary premolded article or the secondary premolded article in the method for manufacturing the preform in accordance with an embodiment of the present invention. 1001 illustrates a prepreg sheet 22 in which prepreg tapes 21 are laid. 1002 illustrates the intermediate base material ([0°/90°] laminated intermediate base material) obtained by laminating two prepreg sheets 22 so that respective reinforcing fiber orientation directions of the two prepreg sheets 22 intersect at right angles.

The tape-like prepregs were laid without any gaps as illustrated in 1001 of FIG. 10 so as to prepare a sheet-like prepreg (prepreg sheet).

(Lamination)

The prepreg sheets were laminated such that the orientation directions of the reinforcing fibers contained in the sheets were orthogonal to each other. Then, as illustrated in 1002 of FIG. 10, an intermediate base material was obtained by laminating two prepreg sheets so that respective reinforcing fiber orientation directions of the two prepreg sheets intersect at right angles (such an intermediate base material may be abbreviated as "[0°/90°] laminated intermediate base material").

(Debulking)

The laminated intermediate base material was carried onto a flat workbench, and was covered with a debulking device (T-7 seal system; manufactured by TORR SCIENCE CO., Ltd.). Then, the laminated intermediate base material was debulked by using a vacuum pump to cause the inside of the debulking device to be in a state of reduced pressure. The conditions for the state of reduced pressure were: a vacuum pressure of 700 mmHg; and a pressure-reduction time of 5 minutes. Then, the internal pressure of the debulking device was returned to an atmospheric pressure, so that the debulked laminated intermediate base material was obtained.

(Preparation of Primary Premolded Article)

The debulked laminated intermediate base material was placed on the opening of a lower mold having open upper surface, and then partially fixed to the lower mold by tackiness of the laminated intermediate base material, as illustrated in FIG. 9. The laminated intermediate base material thus fixed was heated at 70° C. for 30 seconds with use of a movable infrared heater. Then, the upper mold 8 attached to the simple molding machine 7 of FIG. 6 was lowered so as to sandwich the debulked laminated intermediate base material with the lower mold 5 and the upper mold 8. In this way, the debulked laminated intermediate base material was preformed. Next, the lower mold 5 and the upper mold 8 were cooled by blowing air thereto. This prepared a primary premolded article. Then, the upper mold was lifted, so that the primary premolded article was obtained.

(Preparation of Secondary Premolded Article)

After the preparation of the primary premolded article, the debulked [0°/90°] laminated intermediate base material was fixed to one end of the primary premolded article by tackiness of the laminated intermediate base material. Thereafter, by the procedure similar to that in the preparation of the primary premolded article, the laminated intermediate base material and the primary premolded article were preformed by fitting the molds with each other. This prepared a secondary premolded article.

(Preparation of Preform)

The [0°/90°] laminated intermediate base material was placed on the secondary premolded article, and the secondary premolded article and the intermediate base material were repeatedly subjected to the step of fitting the molds with each other. Ultimately, a secondary premolded article ([0°/90°]$_5$), in which five of the [0°/90°] laminated intermediate base materials were laminated as primary premolded articles, was obtained.

Example 12

A preform was obtained as in Example 11 except that, instead of laying the prepreg tapes without gaps, prepreg tapes were provided such that the lateral edge portions of adjacent prepreg tapes overlap by 1.0 mm (the ratio of the overlapping length to the entire width of the tape was 7.9%).

Example 13

A preform was obtained as in Example 11 except that (i) the second to fourth layers of the [0°/90°]$_5$ were intermediate base materials in which the overlapping length of the prepreg tapes was 1.0 mm (the ratio of the overlapping length to the entire width of the tape was 7.9%) and (ii) the first and fifth layers of the [0°/90°]$_5$ were intermediate base materials in which prepreg tapes having a width of 6.3 mm and prepreg tapes having a width of 12.7 mm were alternated so as to overlap by 1.0 mm.

Example 14

A preform was obtained as in Example 11 except that the prepreg tapes were spaced by 1.0 mm (7.9%).

Example 15

A preform was obtained as in Example 11 except that the reinforcing fiber base material used as changed from the carbon fiber bundle to a cloth material, TR3110 360GMP.

Comparative Example 5

A preform was obtained by laminating the intermediate base materials until "[0°/90°]$_5$" was obtained in the above lamination and carrying out Preforming 1. Specifically, for preparing the preform in accordance with Comparative Example 5, the preforming step was carried out only once, and it was after five of the [0°/90°] laminated intermediate base materials were laminated.

Comparative Example 6

The first and fifth layers of the [0°/90°]$_5$ were intermediate base materials in which the overlapping length of the prepreg tapes was 1.0 mm (the ratio of the overlapping length to the entire width of the tape was 7.9%). The second to fourth layers of the [0°/90°]$_5$ were intermediate base materials in which the prepreg tapes having widths 12.7 mm were laid without any gaps.

In addition, a primary premolded article was prepared. Then, after the upper mold was lifted, the primary premolded article was taken out of the lower mold. The primary premolded article thus taken out was provided in the lower mold again. The [0°/90°] laminated intermediate base material was placed on and fixed to the primary premolded article. In this way, a secondary premolded article was prepared. Thereafter, the process of taking the secondary premolded article out and preforming the secondary premolded article was repeated until the fifth layer was obtained. In this way, a desired preform ([0°/90°]$_5$) was obtained.

[Evaluation of Preform]

The preforms in accordance with Examples 11 to 15 and Comparative Examples 5 and 6 were observed, and were evaluated for the following three characteristics according to the criteria for each of the characteristics.

Evaluation (12): Properties to Follow the Shape of the Mold

A: The prepreg sheet was sufficiently following the shape of a mold.

B: Although wrinkles occurred, the wrinkles were expected to be reduced by press molding, and were therefore acceptable.

C: The prepreg sheet was insufficiently following the shape of a mold, so that wrinkles appeared to such an extent that large wrinkles would remain even after the press molding.

Evaluation (13): Wrinkles at Central Portion

A: Due to sufficient deformations and movements of the prepreg sheet, no wrinkles were observed at the central portion of a floor, which central portion included unevenness in the molded article.

B: Although wrinkles were slightly observed in the central portion of the floor, the extent of the wrinkles was such that the wrinkles were expected be reduced by press molding.

C: Deep and severe wrinkles occurred in the central portion of the floor, so that carry out press molding was expected to be difficult.

Evaluation (14): Fiber Meandering During Preforming

A: Neither fiber meandering nor fiber twisting during preforming was observed.

B: Although slight fiber meandering or fiber twisting during preforming was observed, the extent thereof was acceptable.

C: Extreme fiber meandering or fiber twisting during preforming was observed.

Tables 4 and 5 show the sheet width, overlapping widths, and evaluation results of the preforms in accordance with Examples 11 to 15 and Comparative Examples 5 and 6. In Table 5, (i) "epp" indicates "carrying out the preforming step for each primary premolded article" and (ii) "ont" indicates "carrying out the preforming step only one time".

TABLE 4

|  | Lamination structure | Tape width [mm] | Layers | Overlapping/ separation | Overlapping/ separation width [mm] |
| --- | --- | --- | --- | --- | --- |
| Example 11 | [0/90]$_5$ | 12.7 | All layers | None | 0 |
| Example 12 | [0/90]$_5$ | 12.7 | All layers | Overlapping | 1 |
| Example 13 | [0/90]$_5$ | 6.3/12.7 | 1st and 5th layers | Overlapping | 1 |
|  |  | 12.7 | 2nd to 4th layers | None | 0 |
| Example 14 | [0/90]$_5$ | 12.7 | All layers | Separation | 1 |
| Example 15 | — | — | All layers | — | — |
| Comparative Example 5 | [0/90]$_5$ | 12.7 | All layers | None | 0 |
| Comparative Example 6 | [0/90]$_5$ | 12.7 | 1st and 5th layers | Overlapping | 1 |
|  |  | 12.7 | 2nd to 4th layers | None | 0 |

TABLE 5

|  | Preforming step | Fixing | Evaluation (12) | Evaluation (13) | Evaluation (14) |
| --- | --- | --- | --- | --- | --- |
| Example 11 | epp | Yes | B | B | B |
| Example 12 | epp | Yes | A | A | A |
| Example 13 | epp | Yes | A | A | A |
| Example 14 | epp | Yes | A | A | A |
| Example 15 | epp | Yes | B | B | B |
| Comparative Example 5 | ont | Yes | B | C | C |
| Comparative Example 6 | ont | Yes | B | B | C |

As shown in Tables 4 and 5, in comparison with the preforms in accordance with Comparative Examples 5 and 6, the following observations were made in the preforms in accordance with Examples 11 to 15: (i) the prepreg sheets followed the shapes of the molds, (ii) no wrinkles appeared in the central portion, and (iii) no fiber meandering or fiber twisting were seen. In particular, the preform in accordance with Example 12 showed no shifting of each layer at the end portions. In addition, the prepreg sheet showed extremely good properties to follow the shape of a part of the corresponding mold, which part corresponds to the bottom surface part 110. This means that a good preform was obtained. In addition, the tows were deformed and moved so as to follow the shapes of the molds.

The preform in accordance with Comparative Example 5 showed that it was not possible to suppress particularly the wrinkles at the central portion, so that extreme fiber meandering or extreme fiber twisting occurred. This is presumably because the preforming step was carried out only once after the five [0°/90°] laminated intermediate base materials were laminated, so that the laminated intermediate base materials did not adhere to each other and consequently moved notably.

The preform in accordance with Comparative Example 6 showed that it was not possible to suppress the wrinkles, so that extreme fiber meandering or extreme fiber twisting occurred. This is presumably because the primary premolded article or the secondary premolded article was taken out from the preform mold and placed in the preform mold again in each preforming step, so that the properties to follow the molds were poor. In particular, many wrinkles appeared in parts of the corresponding molds of the primary premolded articles of the second to fourth layers, which parts correspond to the upright surface part 120. Because these premolded articles were preformed at once while being stacked together, wrinkles remarkably appeared on the outermost surface.

INDUSTRIAL APPLICABILITY

An invention in accordance with an aspect of the present invention makes it possible to provide a prepreg sheet that allows a wrinkle and reinforcing fiber meandering to less occur during molding and that is highly moldable. A prepreg sheet in accordance with an aspect of the present invention can be suitably used particularly to manufacture a molded article having a complicated structure, such as an automobile component.

An invention in accordance with an aspect of the present invention makes it possible to provide a preform that allows a wrinkle and reinforcing fiber meandering to less occur during molding and that is highly moldable. A preform in accordance with an aspect of the present invention can be suitably used particularly to manufacture a molded article having a complicated structure, such as an automobile component.

REFERENCE SIGNS LIST

1, 1*a* Laminated sheet
2, 103 Laminate
3 Debulking device
5 Female mold (lower mold)
6 Movable infrared heater
7 Simple molding machine
8 Male mold (upper mold)
9, 12, 200 Preform
10, 10*a*, 10*b*, 10*c*, 22 Prepreg sheet
11 Ultrasonic cutter
13 Trimming jig
14 Simple pressing machine
21, 100, 100*a*, 100*b*, 100*c*, 100*d*, 100*e*, 100*f*, 100*g*, 100*h*, 100*i*, 100*j* Prepreg tape
101 Primary (secondary) premolded article
102 Intermediate base material
110 Bottom surface part
111 Protruding part
112 Protruding edge part
120 Upright surface part
130 Upper surface part
131 End edge part

The invention claimed is:

1. A prepreg sheet, comprising:
    a plurality of prepreg tapes that are juxtaposed to each other,
    wherein each of the prepreg tapes contains a reinforcing fiber bundle and a matrix resin composition, and has a first lateral edge and a second lateral edge,
    the plurality of prepreg tapes is juxtaposed such that the first lateral edge of any prepreg tape in the plurality of prepreg tapes is overlapping on the second lateral edge of an adjacent prepreg tape from above, and that the second lateral edge of the any prepreg tape is beneath the first lateral edge of another adjacent prepreg tape, and
    a length of overlapping between the any prepreg tape and the adjacent prepreg tape is not less than 1% and not more than 50% of a width of the any prepreg tape.

2. The prepreg sheet according to claim 1, wherein
    a test piece that (i) has a side that is substantially parallel to an orientation direction of a prepreg tape of the plurality of prepreg tapes and (ii) has a square planar shape having a length of 15 cm and a width of 15 cm is cut out from the prepreg sheet, and
    when a side edge portion including the side is lifted so that the side of the test piece is made horizontal, the test piece maintains, for not less than 30 seconds, a shape that the test piece had before being lifted.

3. The prepreg sheet according to claim 1, wherein the length of overlapping is not less than 1.0 mm.

4. The prepreg sheet according to claim 1, wherein the prepreg tapes are identical in width.

5. The prepreg sheet according to claim 1, wherein
    the plurality of prepreg tapes includes prepreg tapes that have respective different widths, and
    the length of overlapping is based on a narrower one between the any prepreg tape and the adjacent prepreg tape.

6. A method for manufacturing an automobile member, comprising:
    curing the prepreg sheet according to claim 1.

7. A covering material-attached prepreg sheet comprising:
    a covering material; and
    the prepreg sheet according to claim 1 provided on the covering material.

8. A method for manufacturing a prepreg sheet, comprising:
    providing a plurality of prepreg tapes each containing a reinforcing fiber bundle impregnated with a matrix resin composition and having a first lateral edge and a second lateral edge, such that the first lateral edge of any prepreg tape in the plurality of prepreg tapes is overlapping on the second lateral edge of an adjacent prepreg tape from above, and that the second lateral edge of the any prepreg tape is beneath the first lateral edge of another adjacent prepreg tape,
    wherein a length of overlapping between the any prepreg tape and the adjacent prepreg tape is not less than 1% and not more than 50% of a width of the any prepreg tape.

9. A method for manufacturing a preform, comprising:
    performing at least one prepreg sheet according to claim 1, or a laminated sheet including one or more of the at least one prepreg sheet, thereby obtaining the preform.

10. A method for manufacturing a fiber-reinforced composite material molded article, the method comprising:
    preparing a preform by preforming at least one of the prepreg sheet according to claim 1, or a laminated sheet including at least one of the prepreg sheet, into a shape that is close to a shape of the fiber-reinforced composite material molded article; and curing the preform by subjecting the preform to heating and pressurization in a mold whose temperature is adjusted to a temperature higher than or equal to a curing temperature of the matrix resin composition, wherein the matrix resin composition is a thermosetting resin composition.

11. A fiber-reinforced composite material molded article which is a cured product of the prepreg sheet according to claim 1.

12. An automobile member, comprising:

the fiber-reinforced composite material molded article according to claim 11.

13. The prepreg sheet according to claim 1, wherein each of the plurality of prepreg tapes has a width falling within a range of 3 mm to 55 mm.

14. The prepreg sheet according to claim 1, wherein the prepreg sheet has a first lateral end and a second lateral end opposite to the first lateral end, the first lateral edge of each of the prepreg tapes is on a side of the first lateral end of the prepreg sheet, and the second lateral edge of each of the prepreg tapes is on a side of the second lateral end of the prepreg sheet, the first lateral edge of all prepreg tapes other than a pair of endmost prepreg tapes in the plurality of prepreg tapes is overlapping on the second lateral edge of the adjacent prepreg tape from above, the second lateral edge of all prepreg tapes other than the pair of endmost prepreg tapes in the plurality of prepreg tapes is beneath the first lateral edge of the another adjacent prepreg tape, and the first lateral edge of one of the pair of endmost prepreg tapes forms the first lateral end of the prepreg sheet and the second lateral edge of the other one of the pair of endmost prepreg tapes forms the second lateral end of the prepreg sheet.

* * * * *